United States Patent
Budzik et al.

(10) Patent No.: US 7,617,199 B2
(45) Date of Patent: *Nov. 10, 2009

(54) CHARACTERIZING CONTEXT-SENSITIVE SEARCH RESULTS AS NON-SPAM

(75) Inventors: Jerome Louis Budzik, Chicago, IL (US); Sanjay Chand Sood, Evanston, IL (US); Lawrence A. Birnbaum, Evanston, IL (US); Kristian J. Hammond, Chicago, IL (US); Andrew Joseph Crossen, Baltimore, MD (US)

(73) Assignees: Northwestern University, Evanston, IL (US); Perfect Market, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/669,826

(22) Filed: Jan. 31, 2007

(65) Prior Publication Data

US 2007/0185863 A1  Aug. 9, 2007

(51) Int. Cl.
*G06F 17/30* (2006.01)

(52) U.S. Cl. ............ 707/4; 707/5; 707/6; 707/10; 704/9; 704/10; 715/204; 715/205; 715/256; 706/20

(58) Field of Classification Search .......... None
See application file for complete search history.

(56) References Cited

U.S. PATENT DOCUMENTS

| | | | |
|---|---|---|---|
| 6,236,768 B1 | 5/2001 | Rhodes et al. | |
| 6,249,784 B1* | 6/2001 | Macke et al. | 707/3 |
| 6,490,579 B1* | 12/2002 | Gao et al. | 707/4 |
| 6,529,892 B1* | 3/2003 | Lambert | 706/55 |
| 6,546,388 B1* | 4/2003 | Edlund et al. | 707/5 |
| 6,581,050 B1 | 6/2003 | Horvitz et al. | |
| 6,961,731 B2* | 11/2005 | Holbrook | 707/102 |
| 6,968,333 B2* | 11/2005 | Abbott et al. | 707/3 |
| 7,099,857 B2* | 8/2006 | Lambert | 706/55 |
| 7,181,438 B1* | 2/2007 | Szabo | 707/2 |
| 7,225,187 B2* | 5/2007 | Dumais et al. | 707/5 |
| 7,426,499 B2* | 9/2008 | Eder | 706/20 |
| 2002/0087535 A1* | 7/2002 | Kotcheff et al. | 707/5 |
| 2003/0069882 A1* | 4/2003 | Nieswand et al. | 707/5 |
| 2003/0195937 A1* | 10/2003 | Kircher et al. | 709/207 |
| 2003/0212669 A1* | 11/2003 | Dedhia et al. | 707/3 |
| 2004/0267700 A1* | 12/2004 | Dumais et al. | 707/2 |

(Continued)

OTHER PUBLICATIONS

Snapshot of Open Road Technologies Inc.'s website as of Jun. 3, 2004, Wayback Machine, Jun. 3, 2004, pp. 1-8.*

(Continued)

*Primary Examiner*—Pierre M Vital
*Assistant Examiner*—Christopher P Nofal
(74) *Attorney, Agent, or Firm*—K& L Gates, LLP

(57) ABSTRACT

Methods and apparatus assessing, ranking, organizing, and presenting search results associated with a user's current work context are disclosed. The system disclosed assesses, ranks, organizes and presents search results against a user's current work context by comparing statistical and heuristic models of the search results to a statistical and heuristic model of the user's current work context. In this manner, search results are assessed, ranked, organized, and/or presented with the benefit of attributes of the user's current work context that are predictive of relevance, such as words in a user's document (e.g., web page or word processing document) that may not have been included in the search query. In addition, search results from multiple search engines are combined into an organization scheme that best reflects the user's current task. As a result, lists of search results from different search engines can be more usefully presented to the user.

31 Claims, 9 Drawing Sheets

U.S. PATENT DOCUMENTS

| | | | |
|---|---|---|---|
| 2004/0267730 A1* | 12/2004 | Dumais et al. | 707/3 |
| 2006/0074883 A1 | 4/2006 | Teevan et al. | |
| 2006/0218138 A1* | 9/2006 | Weare | 707/5 |
| 2006/0259494 A1* | 11/2006 | Watson et al. | 707/10 |
| 2006/0294189 A1* | 12/2006 | Natarajan et al. | 709/206 |
| 2007/0078835 A1* | 4/2007 | Donnelli | 707/3 |
| 2007/0130126 A1* | 6/2007 | Lucovsky et al. | 707/3 |
| 2007/0198340 A1* | 8/2007 | Lucovsky et al. | 705/14 |
| 2007/0198500 A1* | 8/2007 | Lucovsky et al. | 707/4 |
| 2008/0046407 A1* | 2/2008 | Shah et al. | 707/3 |
| 2008/0177994 A1* | 7/2008 | Mayer | 713/2 |

OTHER PUBLICATIONS

"Intellext Emerges From Northwester University's DevLab Incubator with Software that Revolutionizes the Way Computer Users Get Information", Jan. 31, 2005, Intellext, Wayback Machine, pp. 1-3.*

"Date duration results", Time and date . com, Mar. 12, 2008, p. 1.*

Inventor Affiliations, various sources, Wayback Machine, Mar. 12, 2008, pp. 1-13.*

Ref. Y: Snapshot of Goebel Group's website as of Jan. 23, 2005, Wayback Machine, Jan. 23, 2005, pp. 1-5.*

Budzik, J., Bradshaw, S. Fu, X., and Hammond, K. Supporting Online Resource Discovery in the Context of Ongoing Tasks with Proactive Software Assistants, Jan. 2002, Academic Press, International Journal of Human-Computer Studies, 56(1), pp. 47-74.*

Henzinger, M., Chang, B., Milch, B., Brin, S. "Query-Free News Search" in *Proceedings of the 12th International Conference on the World Wide Web*. Budapest: May 20-24, 2003.

Alexa, Available at http://www.alexa.com/.

1-click Answers, Available at http://www.answers.com/main/product_info.jsp.

Autonomy ActiveKnowledge Press Release, Available at http://www.autonomy.com/content/News/Releases/1997/0407.en.html (Apr. 7, 1999).

Excite, Available at http://www.excite.com/.

Google, Available at http://www.google.com/.

Lycos, Available at http://www.lycos.com/.

Yahoo!, Available at http://www.yahoo.com/.

Yahoo! Maps, Available at http://maps.yahoo.com/.

Billsus, D., and Pazzani, M., "A Personal News Agent that Talks, Learns and Explains," in *Proceedings of The Third International Conference on Autonomous Agents*, (Minneapolis MN, USA, May 9-13, 1998) ACM Press, 1998.

Maglio, P., Barrett, R., Campbell, C., Selker, T., "SUITOR: An Attentive Information System," in *Proceedings of IUI 2000*, (New Orleans, Louisiana, United States, Jan. 9-12, 2000) ACM Press, 2000.

Trevor, J., Hilbert, D., Billsus, D., Vaughan, J., and Tran, Q., "Contextual Contact Retrieval," in *Proceedings of IUI 2004*, (Funchal, Maderia, Portugal, Jan. 13-16, 2004) ACM Press, 2004.

Bradshaw, S., Scheinkman, A., and Hammond, K. J., "Guiding People to Information: Providing an Interface to a Digital Library Using Reference as a Basis for Indexing," in *Proceedings of The 2000 International Conference on Intelligent User Interfaces*, (New Orleans, Louisiana, USA, Jan. 9-12, 2000), ACM Press, 2000.

Bradshaw, S., Hammond, K. J., "Automatically Indexing Documents: Content vs. Reference," in *Proceedings of Sixth International Conference on Intelligent User Interfaces*, (San Francisco, CA, USA Jan. 13-16, 2002), ACM Press, 2002.

Budzik, J., Hammond, K. J., Marlow, C., and Scheinkman, A., "Anticipating Information Needs: Everyday Applications as Interfaces to Internet Information Resources," in *Proceedings of The 1998 World Conference of the WWW, Internet and Intranet*, (Orlando, FL), AACE Press, 1998.

Budzik, J., and Hammond, K. J., "User Interactions with Everyday Applications as Context for Just-in-time Information Access," in *Proceedings of The 2000 International Conference on Intelligent User Interfaces*, (New Orleans, Louisiana, USA Jan. 9-12, 2000), ACM Press, 2000.

Budzik, J., Hammond, K., and Birnbaum, L., "Information Access in Context," *Knowledge Based Systems*, 14(1-2), 37-53, Sep. 30, 2001.

Budzik, J., Bradshaw, S., Fu, X., and Hammond, K. J., "Supporting on-line resource discovery in the context of ongoing tasks with proactive software assistants," *International Journal of Human-Computer Studies*, 56, 47-74, Jan. 2002.

Chen, L., and Sycara, K., "WebMate: A Personal Agent for Browsing and Searching," in *Proceedings of The Second International Conference on Autonomous Agents*, ACM Press, Sep. 30, 1998.

Chen, L., Cheng, S., Birnbaum, L., and Hammond, K. J., "The interactive chef: a task-sensitive assistant," in *Proceedings of the 7th International Conference on Intelligent User Interfaces* (San Francisco, CA USA Jan. 13-16, 2002), ACM Press, 2002.

Cheng, I., and Wilensky, R., An Experiment in Enhancing Information Access by Natural Language Processing, Technical Report, Computer Science Division, University of California, Berkeley, Berkeley, CA CSD-97-963, Jul. 1997.

Dean, J., and Henzinger, M. R., "Finding related pages in the World Wide Web," in *Proceedings of The Eighth International World Wide Web Conference* (Toronto, Canada May 11-14, 1999), Elsevier, 1999.

Hearst, M., Pedersen, J., and Karger, D., "Scatter/Gather as a Tool for the Analysis of Retrieval Results," in *Proceedings of The AAAI Fall Symposium on AI Applications in Knowledge Navigation*, (Cambridge, MA Nov. 1995), AAAI Press, 1995.

Horvitz, E., Breese, J., Heckerman D., Hovel, D., and Rommelse, K., "The Lumiere Project: Bayesian User Modeling for Inferring the Goals and Needs of Software Users," in *Proceedings of The Fourteenth Conference on Uncertainty in Artificial Intelligence* (Jul. 1998), AAAI Press, 1998.

Howe, A. E., Dreilinger, D., "SavvySearch: A Meta-Search Engine that Learns which Search Engines to Query," *AI Magazine*, 18(2), 19-25, Jan. 28, 1997.

Johnson, C., Birnbaum, L., Bareiss, R., and Hinrichs, T., "Integrating Organizational Memory and Performance Support," in *Proceedings of The 1999 International Conference on Intelligent User Interfaces*, (Los Angeles, CA USA Jan 5-8, 1999) ACM Press, 1999.

Kulyukin, V., "Application-Embedded Retrieval from Distributed Free-Text Collections," in *Proceedings of The Sixteenth National Conference on Artificial Intelligence*, (Orlando FL, USA Jul. 18-22, 1999) AAAI Press, 1999.

Leake, D., Scherle, R., Budzik, J., and Hammond, K. J., "Selecting Task-Relevant Sources for Just-in-Time Retrieval," in *Proceedings of The AAAI-99 Workshop on Intelligent Information Systems*, (Orlando FL, USA Jul. 18-22, 1999) AAAI Press, 1999.

Lieberman, H., "Letizia: An Agent That Assists Web Browsing," in *Proceedings of The International Joint Conference on Artificial Intelligence*, (Montreal, Quebec, Canada, Aug. 20-25, 1995).

Lieberman, H., "Integrating User Interface Agents with Conventional Applications," in *Proceedings of The 1998 International Conference on Intelligent User Interfaces (IUI 98)*, (San Francisco CA, USA Jan. 6-9, 1998), ACM Press, 1998.

Pazzani, M., Muramatsu J., and Billsus, D., "Syskill & Webert: Identifying interesting Web sites," in *Proceedings of The Fourteenth National Conference on Artificial Intelligence*, (Portland OR, USA, Nov. 9-11, 1996) AAAI Press, 1996.

Phelps, T., and Wilensky, R., "Robust Intra-document Locations," in *Proceedings of Ninth International World Wide Web Conference*, (Amsterdam, The Netherlands May 15-19, 2000), Foretec Seminars, 2000.

Rhodes, B., and Starner, T., "A continuously running automated information retrieval system," in *Proceedings of The First International Conference on The Practical Application of Intelligent Agents and Multi Agent Technology*, 487-495, May 1, 1996.

Rhodes, B., "Margin Notes: Building a Contextually Aware Associative Memory," in *Proceedings of The 2000 International Conference on Intelligent User Interfaces*, (New Orleans, Louisiana, USA Jan. 9-12, 2000), ACM Press, 2000.

Salton, G., Wong, A., and Yang, C. S., "A vector space model for automatic indexing," *Communications of the ACM*, 18(11), 613-620, Nov. 1975.

Salton, G., and Buckley, C., "Improving Retrieval Performance by Relevance Feedback," in: Sparck Jones, K., and Willett, P., ed., *Readings in Information Retrieval*. San Francisco, CA: Morgan Kauffman, Dec. 1997.

Krema, M., Birnbaum, L., Budzik, J., and Hammond, K. Themometers and Themostats: Characterizing and Controlling Thematic Attributes of Information. In *Proceedings of Intelligent User Interfaces 2002* (San Francisco CA USA, Jan. 13-16, 2002). ACM Press, 2002.

Selberg, E., and Etzioni, O., "The MetaCrawler Architecture for Resource Aggregation on the Web," *IEEE Expert*, Nov. 8, 1996.

Turney, P., Learning to Extract Keyphrases from Text, National Research Council Canada, Institute for Information Technology NRC-41622, Feb. 17, 1999.

Zamir, O., and Etzioni, O., "Grouper: A Dynamic Clustering Interface to Web Search Results," in *Proceedings of The Eighth International Conference on the World-Wide Web*, (Toronto Canada, May 11-14, 1999) Elsevier, 1999.

Budzik, J., and Hammond, K. (1999). Watson: Anticipating and Contextualizing Information Needs. In Proceedings of the Sixty-Second Annual Meeting of the American Society for Information Science (Oct. 31, Nov. 4, 1999). Learned Information, Inc., Medford, NJ, 1999.

Budzik, J. *Information Access in Context*. (Ph. D. Diss., Northwestern University, Jun. 2003).

Budzik, J., Hammond, K., Birnbaum, L., and Krema (2000). Beyond Similarity. In *Working notes of the AAAI 2000 Workshop on AI for Web Search* (Austin TX USA, Jul. 30-Aug. 1, 2000), Jul. 2000, AAAI Press.

Budzik, J., and Hammond, K. (1999). Watson: An Infrastructure for Providing Task-Relevant, Just-In-Time Information. Presented at AAAI 1999 Workshop on Intelligent Information Systems (Orlando FL USA, Jul. 18-19, 1999).

Budzik, J., Hammond, K., and Birnbaum, L. Information access in Context. *Knowledge-Based Systems* 14(1-2), pp. 37-53, Mar. 2001. Elsevier.

Knoblock, C., and Minton, S., "The Ariadne Approach to Web-Based Information Integration," *IEEE Intelligent Systems*, 13(5), Sep./Oct. 1998.

Lieberman, H., Rosenzweig, E., and Singh, P., "Aria: An Agent For Annotating And Retrieving Images," *IEEE Computer*, Jul. 2001.

Czerwinsky, M., Dumais, S., Robertson, G., Dziadosz, S., Tiernan, S., Dantzich, M., "Visualizing implicit queries for information management and retrieval," In *Proceedings of CHI 1999*. (Pittsburgh, PA, USA, May 15-20) New York: ACM Press, 1999.

Dumais, S., Cutrell, E., Sarin, R., Horvitz, E., "Implicit queries (IQ) for contextualized search", In *Proceedings of SIGIR 2004*. (Sheffield, UK, Jul. 25-29, 2004). New York: ACM Press, 2004.

Price, M., Golovchinksy, G., and Schilit, B., "Linking by inking: trailblazing in a paper-like hypertext" In *Proceedings of Hypertext 1998*. (Pittsburgh, PA, USA, Jun. 20-24, 1998). New York: ACM Press, 1998.

Bush, V., "As We May Think" *Atlantic Monthly*, Jul. 1945.

Hearst, M., "Next Generation Web Search: Setting Our Sites", in IEEE Data Engineering Bulletin, Special issue on Next Generation Web Search, Sep. 2000.

International Search Report for International Application No. PCT/US 07/06138 of Applicants Budzik, et al.

* cited by examiner

CHARACTERIZING CONTEXT-SENSITIVE SEARCH RESULTS AS NON-SPAM

TECHNICAL FIELD

The present disclosure relates in general to searching computerized information repositories, and, in particular, to methods and apparatus for assessing, ranking, organizing, and presenting search results associated with a user's current work context.

BACKGROUND

Many people use a variety of different computer-based information sources such as search engines (e.g., Google™, MSN®, Yahoo!®, etc.) to find information they are seeking. Typically, users are looking for information relevant to a work task in which they are currently engaged. For example, a user may be interested in information related to a topic already displayed be a web browser, or a user may be interested in information related to a word processing document they are currently working on (e.g., a word processing document). Typically, the user enters a query into an input box, and the search engine examines data associated with thousands of documents. The search engine then sends the user list of search results. In an effort to help users find relevant information quickly, most information sources rank search results for presentation to the user, thereby reducing the user's need to wade through a long list of search results. For example, documents that a search engine determines to be most relevant to the user's query are typically placed first in a list of search results.

Typically, search engines use some form of term frequency—inverse document frequency (TF/IDF) ranking algorithm or some similar method to determine this presentation order or other organization scheme. TF/IDF scores documents in direct proportion to the number of query terms present in the document and in inverse proportion to some function of the number of times the query terms appear in the information repository as a whole. In other words, documents with many occurrences of rare query terms are ranked highly. In addition, other factors may be used to rank the documents, such as the number of times other documents reference that document. Search engines might also display the documents retrieved based on data associated with the retrieved documents. For example, documents labeled with the same subject area might be presented in the same folder.

One problem with this method of ranking, organizing and presenting retrieved documents when seeking information related to a user's current work context is that the query terms alone are used to assess the relevance of the search results in the course of retrieval. However, most search engines place limitations on the length of the query and/or limitations on other aspects of the manner in which the search may be specified (e.g., the types of constraints that may be specified on desired results). For example, a search engine may limit the number of terms in a query to five, or the search engine may not contain a method for specifying a date range. In general, however, the user's current context is typically too complex to be represented in such a compressed and simplified form. For example, if the document the user is currently working on—an important aspect of the user's context—has more than five relevant terms, but a search engine only accepts queries that are five words long, the query alone is not necessarily the best representation of the user's current work context with which to assess relevance, since the user's current document (e.g., web page or word processing document) contains information beneficial to assessing the relevance of a search result that is not easily communicated to the search engine in the form of a query. Other properties of the user's current work context, for example, their task (e.g., drafting a legal document), stage in that task, their role in an organization (e.g., lawyer), the nature of that organization (e.g., a law firm), specified areas of interest (e.g., patents), the application in which they are working (e.g., a word processor), the document genre or type (e.g., legal brief, or resume) or their past behavior, might also be important aspects of assessing the relevance of a given search result. Therefore, assessing, ranking, organizing, and presenting search results associated with the user's context simply using a query acceptable to a given search engine may not produce the best results.

Moreover, as described above, the user's current document by itself typically does not constitute the entire user context in terms of which relevance of information should be assessed. Other factors, including, but not limited to, the user's task, the state of that task, the organization for which the work is being performed, the user's role in that organization, explicit user indications, the application in which the user is working on the document, the document genre, etc., may also important in determining a ranking, organization, and presentation of search results that truly reflects the user's information needs.

Consider, for example, the task of writing a scientific research paper. Presentations to others may be given before the work is more broadly published. Therefore, at the beginning of the writing task, it may be useful to assemble information by the author that very closely matches the first drafts of the paper, so that those prior writings may be reused. Later in the process, when the author is assembling related work, it may be desirable to relax those constraints so as to provide a broader, more complete set of search results. In this example, the stage and type of task influence the character of the search results desired. However it may not be possible to specify this directly to a typical search engine.

In addition, the best strategy for presenting information should be determined. For example, while composing an electronic mail message, prior messages sent to and/or received from the recipients of the current message may be retrieved. These messages may be presented next to the email editor window organized in headers labeled by the name of the recipient. Messages in each header may also be organized in a ranked list, where items on the top of the list are ordered from most to least similar to the contents of the body of the message being composed. The system may also draw icons next to each email recipient indicating the presence of the additional information. When the user moves his/her mouse over those icons, the system may present the best matching email, so as to give the user a preview of the available information. In contrast, while shopping online and viewing a product, information might be displayed in a window next to the user's web browser, organized in categories. Reviews of that product may be organized in one category, accessories in another category, and prices under yet another category. An improved search system should be able to determine how to present information to the user using a strategy that works better for the work context in which the user is currently engaged.

Another problem with relying solely on the rankings or organization schemes provided by search engines themselves occurs when querying multiple information sources. Different information sources typically do not use the same scoring algorithm in determining what to return and what order to return it in or in determining how to organize and present these results. As a result, ranking and/or organizing scores associated with results from different search engines (if returned to the requester of the search at all) typically cannot reliably be used to combine multiple result lists into combined results lists. This is typically acceptable only if information from different information sources is presented under different headings (e.g., one heading for each information source). If, however, headings are defined functionally or by content rather than just by information source, then a common assessment, ranking, organization, and presentation system may be needed in order to determine which results would be most useful to the user, which results should be presented to the user, and how the results should be organized and presented to the user (e.g., in what order). Similarly, if a unified view of information from a variety of information sources is desired, a common assessment, ranking, organization, and presentation system may be needed.

SUMMARY

The system described herein solves these problems by automatically generating search queries based on the user's current work context. For example, a user's work context may include different aspects such as text associated with a website or a word processing document as well as a task associated with the user such as the task of "budgeting." The user's current work context may include the document the user is currently working on (e.g., a web page or a word processing document) as well as other variables as described herein. The system disclosed herein then automatically searches, assesses, ranks, organizes, and presents the search results based on a rich model of the user's current work context instead of simply relying on the user entered search queries and the search engine's assessments, rankings, etc., because the search engine assessments, rankings, etc., are based on the much more limited search query provided to the information source. In certain embodiments, the system described herein accomplishes this by comparing statistical and heuristic models of the search results to a statistical and heuristic model of the user's current work context, including the document currently being manipulated by the user. As described in detail below, this is an improvement over existing search engines (e.g., Google™, MSN®, Yahoo!®, etc.).

The first problem is solved because search queries are automatically generated each time the user's current context changes (and/or periodically), and the limitations each search engine places on the query or results format and expressiveness, are not also limitations on algorithms that may be used to assess, rank, organize and present search results. For example, such algorithms may represent the user's current work context using more than five terms, or using features of the user's work context other than just terms of the sort usable in search queries. For example, the search results may be ranked with the benefit of other words in the user's current document that may not have been included in the search query. For example, a search engine query may be limited to the terms "dog" and "cat," but a particular search result and the user's current document may also contain the word "mouse," making one search result potentially more relevant than another search result that contains the words "dog" and "cat" but does not contain the word "mouse." Other features, such as the task the user is currently performing in a desktop application, may be used to inform the ranking and presentation of search results. For example, if the user is viewing a contact in a personal information management application such as Microsoft Outlook®, home pages for the contact person might be ranked more highly than other retrieved documents, and could be presented in a separate folder in the list of search results retrieved.

The second problem is solved because search results from multiple search engines can be analyzed and organized together by the same algorithm, based on the same information about the user's current work context. For example, bold face words in a current word processing document may be given additional raking weight, and search results from different search engines can be usefully compared with each other in terms of potential relevance to the user's current work context, and so, for example, meaningfully combined into a single ranked list or other unified presentation scheme, which may itself be determined by the user's current work context.

DETAILED DESCRIPTION OF EXEMPLARY EMBODIMENTS

Figure 1:
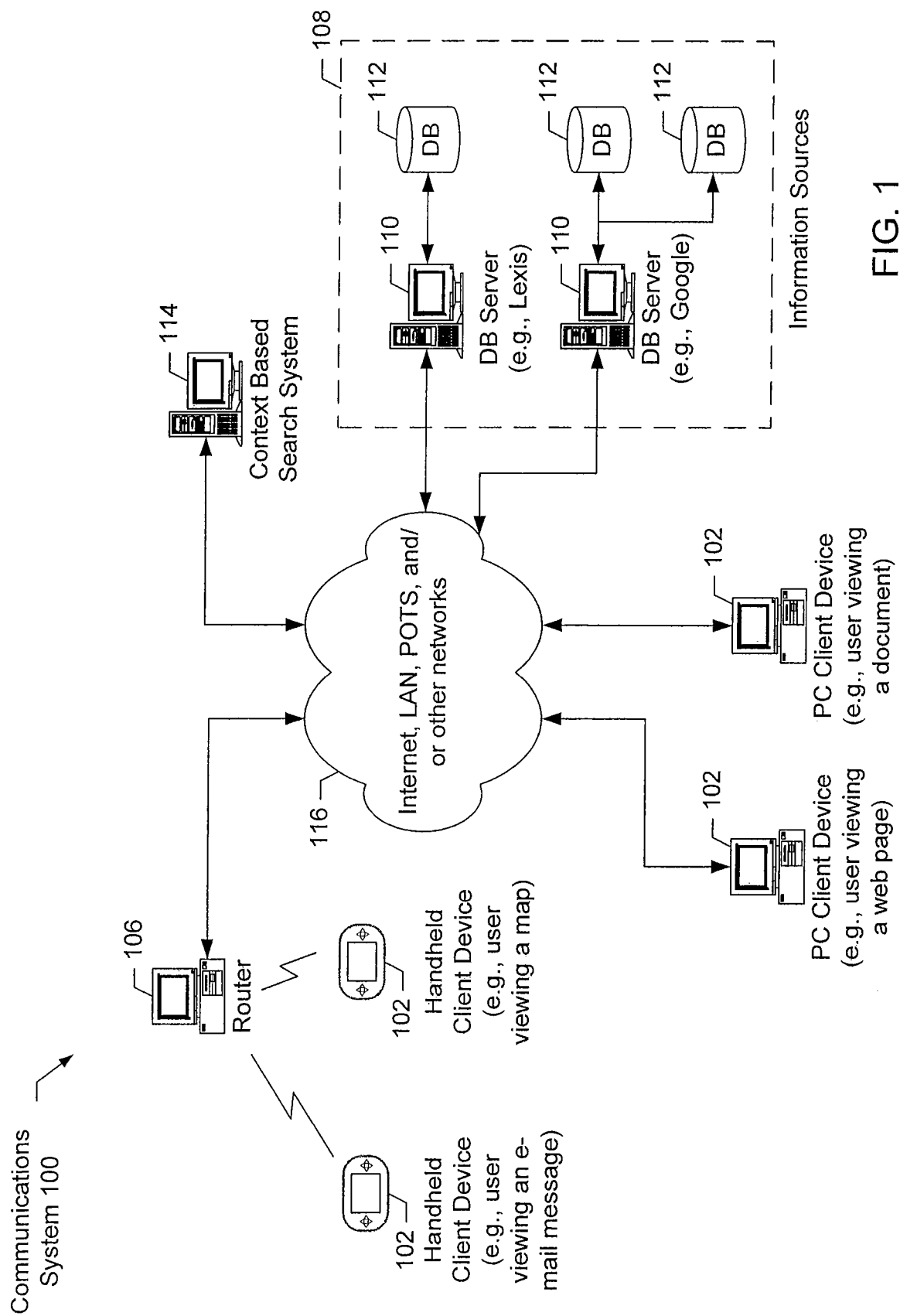
FIG. 1 is a high level block diagram of an example communications system.

The present system is most readily realized in a network communications system. A high level block diagram of an exemplary network communications system 100 is illustrated in FIG. 1. The illustrated system 100 includes one or more client devices 102, one or more routers 106, a plurality of different information sources 108 including database servers 110 and/or databases 112, and one or more context based search systems 114. Each of these devices may communicate with each other via a connection to one or more communications channels 116 such as the Internet and/or some other data network, including, but not limited to, any suitable wide area network or local area network. It will be appreciated that any of the devices described in the examples herein may be directly connected to each other instead of over a network. In addition, any combination of devices described in the examples herein may be embodied in a single device.

The information sources 108 store a plurality of files, programs, and/or web pages in one or more databases 112 for use by the client devices 102. For example, a database server 110 may be associated with a publicly available search engine such as Google™, MSN®, or Yahoo!®. In addition, a database server 110 may include commercial databases such as Lexis® and Westlaw®. Still further, a database server 110 may be a local database server such as a corporate intranet server. The databases 112 may be connected directly to the database servers 110 and/or via one or more network connections.

Data from the information sources 108, which is relevant to content in documents displayed on the client devices 102, is sent to the client devices 102 via the communications channel 116. For example, a user of a client device 102 may be viewing a web page related to an automobile, and the client device 102 may receive a list of hyperlinks to other web pages related to that automobile. In one embodiment, the information sources 108 communicate directly with each client device 102. In other embodiments, the information sources 108 communicate with the client devices 102 via a search system 114.

One information source 108 and/or one search system 114 may interact with a large number of other devices. Accordingly, each information source 108 and/or search system 114 is typically a high end computer with a large storage capacity, one or more fast microprocessors, and one or more high speed network connections. Conversely, relative to a typical server 110 (or in some embodiments system 114), each client device 102 typically includes less storage capacity, a single microprocessor, and a single network connection.

Figure 2:
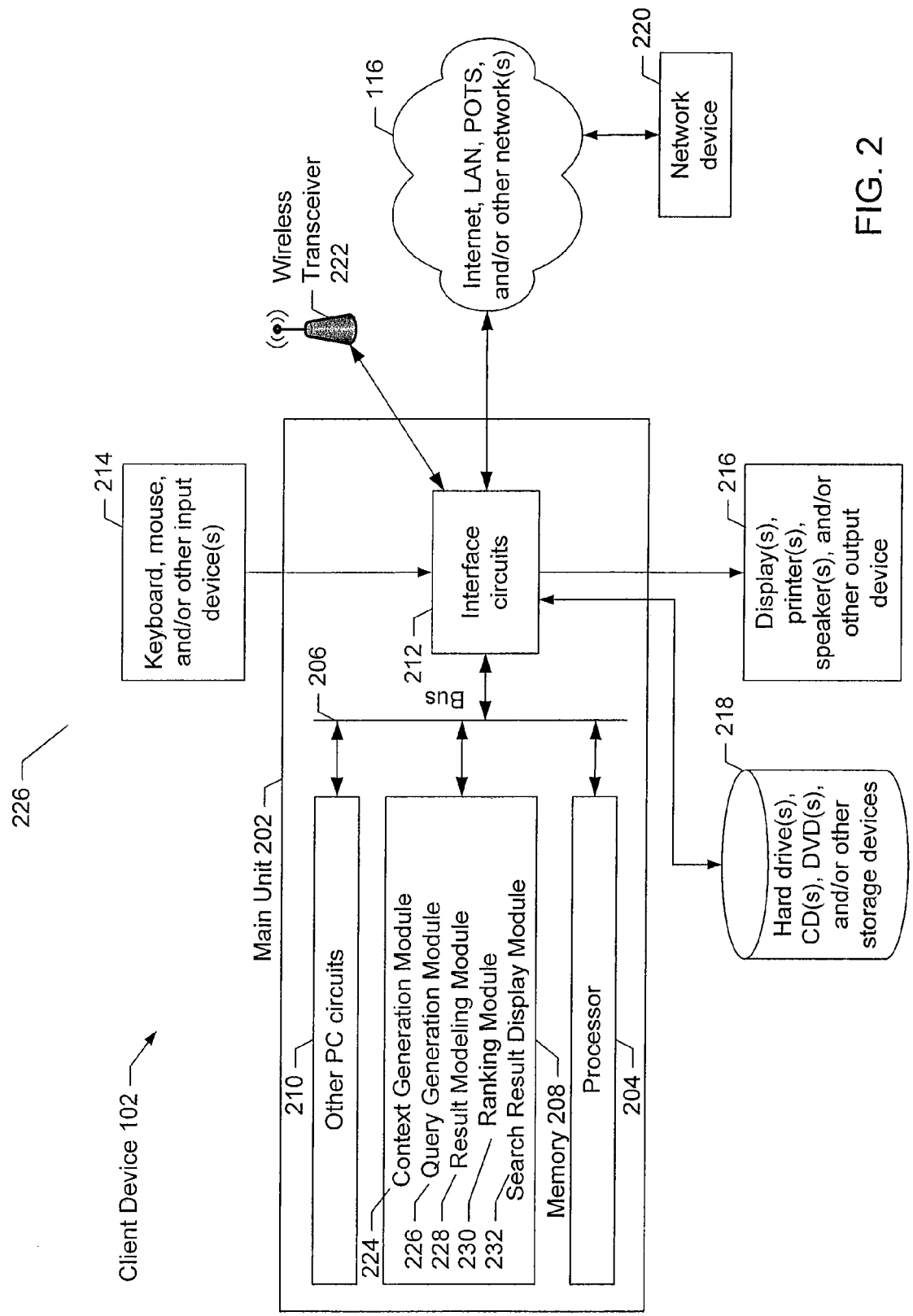
FIG. 2 is a more detailed block diagram showing one example of a client device.

A more detailed block diagram of the electrical systems of an example client device 102 is illustrated in FIG. 2. Although the electrical systems of different client devices 102 may be similar, the structural differences between these devices are well known. For example, a typical handheld client device 102 is small and lightweight compared to a typical personal computer 102.

The example client device 102 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner.

In this example, the memory 208 includes a context generation module 224, a query generation module 226, a result modeling module 228, an assessment, organization, and ranking module 230, and a search result display module 232. The context generation module 224 examines documents (e.g., web pages, e-mails, word processing documents, slide presentations, spread sheets, etc.) and other variables (e.g., user task and task state, application type, document genre, user role, etc.) to create context models as described below. The query generation module 226 forms multiple information queries targeted to multiple information sources 108 as described in detail below. The result modeling module 228 examines search results (e.g., summaries, web pages, documents, etc.) to create search result models as described in detail below. The assessment, and organization, and ranking module 230 compares search results models to original context models to assess, rank, and organize search results from single or, more usually, multiple information sources 108 as described in detail below. The search result display module 232 displays ranked and organized search results received from the search system 114 to the user (e.g., in a sidebar to the associated document) as described below. The memory 208 may also store other information such as digital data indicative of documents, files, programs, web pages, etc. retrieved from another computing device and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), a plasma device, or any other type of display. The display 216 generates visual displays of data generated during operation of the client device 102. For example, the display 216 may be used to display search results received from the search system 114 including data from multiple information sources 108. The visual displays may include prompts for human input, run time statistics, calculated values, data, etc.

One or more storage devices 218 may also be connected to the main unit 202 via the interface circuit 212. For example, a hard drive, CD drive, DVD drive, a flash device, and/or other storage devices may be connected to the main unit 202. The storage devices 218 may store any suitable type of data. The client device 102 may also exchange data with other network devices 220 via a wireless transceiver 222 and/or a connection to the network 116. The network connection may be any suitable type of network connection, such as an Ethernet connection, digital subscriber line (DSL), telephone line, coaxial cable, etc.

Figure 3:
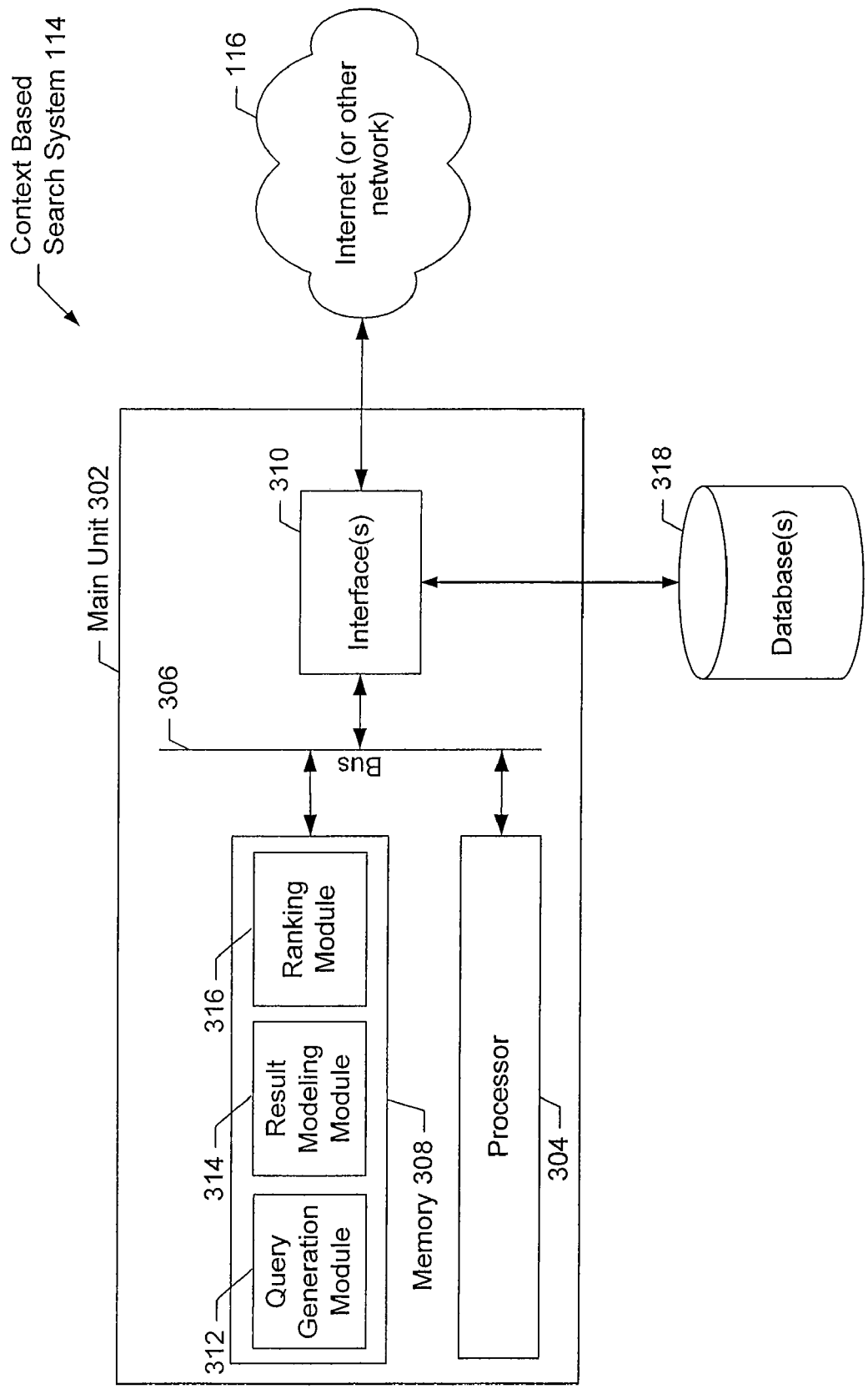
FIG. 3 is a more detailed block diagram showing one example of a context based search system.

In some embodiments, a context based search system 114 is used. A more detailed block diagram of a context based search system 114 is illustrated in FIG. 3. A main unit 302 in the search system 114 preferably includes a processor 304 electrically coupled by an address/data bus 306 to a memory device 308 and a network interface circuit 310. The network interface circuit 310 may be implemented using any suitable data transceiver, such as an Ethernet transceiver. The processor 304 may be any suitable type of well known processor, and the memory device 308 preferably includes volatile memory and non-volatile memory. Preferably, the memory device 308 stores a software program that implements all or part of the method described below.

In particular, the memory preferably stores a query generation module 312, a result modeling module 314, and an assessment, ranking, and organization module 316. The query generation module 312 forms multiple search queries targeted to multiple information sources 108 as described in detail below. The result modeling module 314 examines search results (e.g., summaries, web pages, documents, etc.) to create search result models as described in detail below. The assessment, ranking, and organization module 316 compares search results models to original context models to rank and organize search results from multiple information sources 108 as described in detail below. These software modules 312, 314, 316 may be executed by the processor 304 in a well known manner. However, some of the steps described in the method below may be performed manually and/or without the use of the search system 114. The memory device 308 and/or a separate database 318 also store files, programs, web pages, etc. for use by other servers 110 and/or client devices 102.

Users of the system 100 may be required to register with the search system 114. In such an instance, each user may choose a user identifier (e.g., e-mail address) and a password which may be required for the activation of services. The user identifier and password may be passed across the network 116 using encryption built into the user's web browser. Alternatively, the user identifier and/or password may be assigned by the search system 114.

Figure 4:
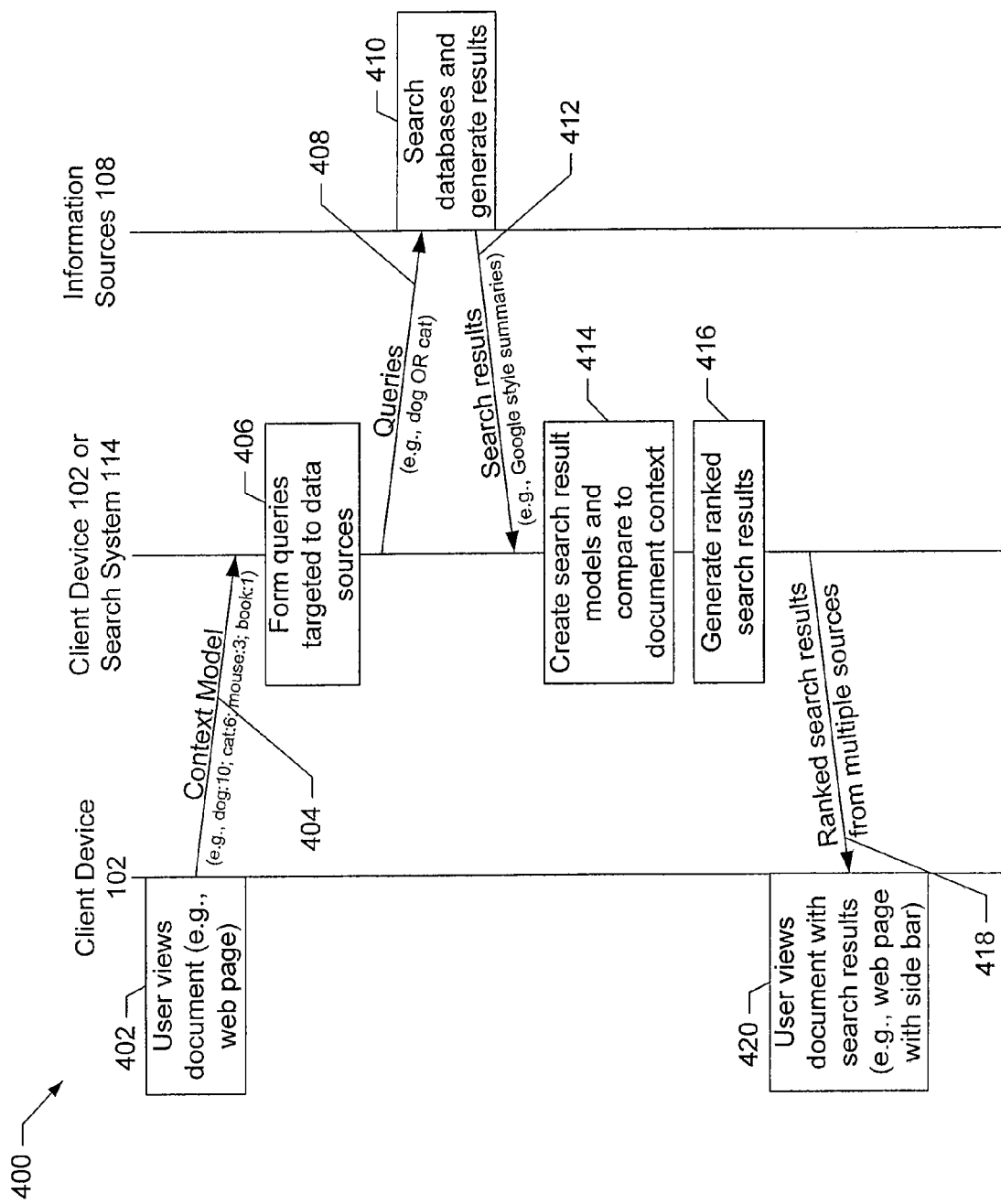
FIG. 4 is a message diagram showing an example communications exchange between a client device, a context based search system, and a plurality of information sources.

A message diagram showing an example communications exchange between a client device 102 and a plurality of information sources 108 is illustrated in FIG. 4. In this example, the communications exchange is initiated by a client device 102 displaying a document to a user (block 402). For example, the client device 102 may be displaying a web page, an e-mail message, a word processing document, a slide presentation, a map, and/or any other suitable document.

Each time the user context on the client device 102 changes, for example, if the content of the document displayed by the client device 102 changes, the client device 102 may automatically generate a context model message 404. For example, when the user stops typing into a word processing document (e.g., no activity for more than five seconds), the client device 102 may generate a context model message 404 representing the current state of the user's context, including the current word processing document, as discussed earlier. Alternatively, or in addition, the client device 102 may generate the context model message 404 in response to other events. For example, the client device 102 may generate the context model message 404 periodically and/or when the focus of the document changes. In other embodiments, the user may initiate this sequence themselves, e.g., by pressing a button.

The context model message 404 includes a context model. The context model is a representation of a user's current context based on the user's current document and/or other factors such as the application type associated with the document, the genre of the document (e.g., legal brief, patent application, resume, etc.), the user's task and the state of that task, explicit indication by the user (e.g., pressing a button, or highlighting some words), the organization in which the user is currently working, and/or the user's role in that organization, etc. Preferably, the context model is generated by the context generation module 224 of the associated client device 102. The context model is a statistical and heuristic model of the user's context. For example, a user context including a user text document including occurrences of the words dog, cat, mouse, and book might be described in part by a context model like "dog:10; cat:6; mouse:3; book:1" where the numbers represent weights associated with the words. In this example, the context model indicates that the associated document is more about dogs than it is about cats. The weights may be assigned by any suitable algorithm. For example, the weighting algorithm may take into account the number of occurrences of each word, the location of each word (e.g., in the title of the document versus in the body), the style of the words (e.g., bold text versus plain text), etc. A detailed discussion of various methods of determining a context model is included in U.S. Patent Publication 2005/0027704, the entirety of which is incorporated herein by reference.

The context model would in many cases also include representations of such factors as the user's current task and task state, the application in which the user is currently working, the document type or genre, the organization in which the user is working, the user's role in this organization, explicit user indications, etc.

In some cases, aspects of the user context may be directly available from the task a user is accessing. For example, aspects of the user context may come from explicit user indication, such as selecting a task from a menu, or using a certain document template (letter, resume, etc.) or other features of the user's application. Other aspects of a task may be directly available through application programming interfaces or by observing communication between the application and other software, such as the operating system, or hardware, such as a network device. In other cases, aspects of the user context may be based on, computed from, or derived from one or more of these directly available aspects. For example, text in the document a user is reading or writing may be directly available through an application programming interface, and then that text could be further processed to classify the user's document into one or more categories (e.g., legal brief, letter, outline, science paper), based on words that are present and/or absent in the document. This classification could then become one aspect of the context model. Other aspects of the user context may also be inferred from directly observable aspects of the user context other than the text of a document the user may be accessing. For instance, the stage in a task may be inferred from a step in a business process management system, or the status of an account as represented by a customer relationship management system.

It is preferable for the context model to contain all of the information useful for retrieving relevant documents from search engines, determining the relevance of those retrieved documents, and further determining how they are relevant. Moreover, the portion of the context model derived from the document itself can in turn be the result of an analysis process that is itself sensitive to all these sorts of features. For example, suppose the text of the user's document is analyzed in order to classify the document into one or more categories based on words that are present or absent in the document, and the current document is classified as a legal brief. As a result of classifying the document as a legal brief, the text may further be analyzed in order to extract the case citations present in the legal brief and to identify the jurisdiction under which the present case is being argued. These aspects (jurisdiction and case citations) may then be added to the context model separately from the original text. In addition, other aspects, such the user's role, may be added to the context model. For example, if the document is a legal brief, and the user is writing the document, the role of legal brief drafter may cause the system to determine that legal opinions from the same judge are relevant. However, if the user is just reading the legal brief, the role of legal brief reviewer may cause the system to determine that other legal documents with similar content are relevant.

The context model may also include the text of the user's document, its classification as a legal brief, and words and phrases that describe the key themes in the dispute. The words and phrases that describe the key themes in the dispute may be based on the text of the original document. For example, words and phrases may be assigned weights and those words with the highest weights may be included in the list of words and phrases that describe the key themes of the dispute. In determining the words that describe the main themes, those terms that occur more frequently may be assigned a higher weight. It is preferable that those terms that occur in more important sections of the document be assigned a higher weight. For example, words that occur in the summary of argument section of a legal brief could be assigned a higher weight than words that only occur in the table of citations section. More specifically, each time a word occurs in a document, one could be added to its weight, whereas if a word occurs in an important section, a number W would be added to its weight, where W is a tunable parameter greater than one. If a word appears in bold or all caps and in an important section a number X could be added to its overall weight, where X is a tunable parameter greater than W.

Furthermore, a list of words could be excluded from appearing in the present list of words that describe the key themes of the document. This list of words to exclude may be selected based on the type of document being viewed. For example, words like "a, an, the, but, or" may be excluded from all documents, whereas words like "jury, testified, defense, court, evidence, trial, alleged," or names of those party to the case, may be excluded specifically from legal briefs. The terms excluded may be based in part on other aspects of the context model. The words or phrases excluded may also be added to the context model, for the purposes of later using them to assess, filter, rank and organize search results. The words or phrases with the biggest N weights could then be collected and assigned to the major themes of the document.

Moreover, the context model may contain more than one list of words and phrases, each list representing separate aspects of the text of the overall document. For example, in a legal brief, one list of words and phrases could represent the statement of jurisdiction. Another list of words and phrases could represent the statement of the case, etc. In another example, if the user is browsing the web and viewing a web page on a news site on which more than one news story is presented, the context representation may include a list of words and phrases describing each story presented. Each list of words and phrases associated with each aspect may be computed using methods described herein. The beginning and end of each news article may be determined first by determining the web page is being served by a news site and second by looking for features that occur between articles, such as article titles and hyperlinks to the full article. The context model may be represented as a list or collection of aspects. In general, one aspect of the context model may be based on one or more other aspects of the context model.

As part of generating the context model, the context generation module 224 makes a determination if a search is likely to return useful results. For example, the user may be viewing the front page of an electronic newspaper covering multiple unrelated topics. By analyzing application and/or genre-specific document features, such as segmentation (e.g., columns in MS Word, frames in HTML, etc.), and/or other properties of the user's context, the query generation module 226 or 312 may determine that a search is unlikely to return useful results, or that certain sources of information may be more likely to contain useful information than other sources of information.

For example, if the user's document contains fewer than N words, where N is a tunable parameter, the query generation module 226 or 312 may determine that a search is not likely to return useful or interesting results. In another example, the average length of a paragraph of text is computed. If the average length of a paragraph of text is below a tunable parameter L, then the query generation module 226 or 312 may determine a search is not likely to return useful or interesting results. The tunable parameter L may be related to other aspects of the user context, such as the type of document or application being accessed. For example, if the user is accessing a contact record in Microsoft Outlook, it is preferable that the paragraph length requirement not apply because contact records are typically very short. If the user is accessing a PowerPoint presentation, it is preferable that the paragraph length requirement be shortened, as PowerPoint presentations typically contain short paragraphs, less than a sentence long. If the user is writing a document in Microsoft Word, however, it is preferable to work with full paragraphs of text.

In cases where a user is browsing the web, query generation module 226 or 312 scans the user's document and counts the number of words in hyperlinks and the number of words not in hyperlinks. If the ratio of hyperlinked to non-hyperlinked words is below a tunable threshold T, then the query generation module 226 or 312 may determine that a search is not likely to return useful or interesting results. In another example, the user may indicate an area of interest, and that area of interest may be represented by terms. If words occurring in areas of interest are not present in the user context, the query generation module 226 or 312 may determine that a search is not likely to yield interesting results. Similarly, areas of disinterest may be represented as lists of terms. If words on that list appear in the user context, the query generation module 226 or 312 may determine that a search is not likely to yield interesting results.

In addition, the query generation module 226 or 312 may analyze the text of the current user document to measure a degree of term overlap. For example, the user's document may be broken up into sections of length W words long. For example by starting at word one, and storing until word W, and then starting at word W/O and then storing until word W+W/O, where W is a tunable parameter and O is a tunable parameter. If a certain threshold degree of commonality exists between document segments (e.g., all of the document segments are relevant to the Olympics), the query generation module 226 or 312 may determine that a search is likely to return useful results. For example if a term occurs in both segment one and in segment two then one may be added to the overlap score of segment one and segment two. If the overlap score of two segments is greater than a threshold that is some function of the length of the text window W, then the two text segments may be called coherent. If a certain portion of subsequent text segments have coherence, then the document as a whole may be called coherent and therefore a search may be allowed to proceed. Otherwise, the query generation module 226 or 312 may determine that a search is not likely to return useful results. In addition, if a certain threshold for density of links on a page is exceeded, the query generation module 312 may determine that the page does not have sufficiently rich content to search. The query generation module 312 may also determine the results of a search may be irrelevant or unnecessary to a user based on the broader, non-document specific components of the context model such as current task, user role, etc.

The query generation module 312 may also use non-document specific context information to override and initiate searching related to a document that does not otherwise meet certain searching criteria (e.g., link density, term overlap). For example, if the user is browsing the web and the document they are viewing is being transmitted over a secure channel, the URL or location of the document may start with the string "https:". It may not be desirable to search automatically based on such pages, because the data within them is often sensitive.

Through such methods, the system prevents retrieval and presentation to the user of information based on user contexts and documents for which the returned items are likely to be ranked low or otherwise prove irrelevant. Conversely, such methods ensure the most relevant information is sought from the information sources 108 most likely to produce it. Preferably, the user would be given an option to override this determination. For example, if the user selects one document segment over others, the query generation module 226 or 312 could focus its analysis on that segment.

If the query generation module 226 or 312 determines that a search is likely to return useful results, the query generation module 226 or 312 forms multiple search queries targeted to multiple information sources 108 (block 406). For example, one information source 108 may allow Boolean operators, and another information source 108 may not allow Boolean operators. Similarly, one information source 108 may allow up to four search terms, and another information source 108 may only allow two search terms. An information source 108 that allows four search terms preferably receives a query including the top four terms in the context model (e.g., dog, cat, mouse, and book), and an information source 108 that only allows two search terms preferably receives a query including the top two terms in the context model (e.g., dog, and cat). Any suitable method of selecting information sources 108 and generating queries may be used. A detailed discussion of various methods of generating queries is included in U.S. Patent Publication 2005/0028156, the entirety of which is incorporated herein by reference.

One or more query messages 408 are then sent to one or more information sources 108. In response to receiving a query message 408, each information source 108 searches one or more information repositories and generates a set of search results (block 410). For example, a search engine such as Google™ may generate a plurality of summaries, wherein each summary includes a portion of an associated document (e.g., a web page). Typically, these summaries are intended to provide a human user with some notion of the associated document's contents so that the user may assess the relevance of the document to the user's needs. Each information source's search results are then transmitted to the search system 114 and/or the client device 102 in a separate search results message 412.

Other information systems 108 may provide other data about the search results, such as the subject area, industry classification, date of publication, or author. This data may also be used as a feature of the result model, included in the search results message 412. In addition, the result model may include the query used to generate those results as a feature, included in the search results message 412. For example, if the query created by the query generation module 226 or 312 is directed at a news database, the result modeling module may treat news items with preference, depending on the original context model. Many information sources allow users to enter additional constraints that significantly change the character, subject area, or other properties of the search results retrieved. For example, users may be able to specify the type of item retrieved, e.g., news, patents, journal articles, or WWW home pages. Other properties, such as the date the document was published, or the WWW location in which the document was published are also often available as constraints on the search query to information sources. These constraints allow the query generation module 226 to specify at a suitable level of specificity what information should be retrieved. The query generation module 226 may only generate queries directed at certain information sources or with certain constraints in response to certain properties of the user context. Any property of the information repository being searched, the search results as a group, or individual results on their own, may be used for the purposes of assessing, ranking, organizing, and presenting search results.

The result modeling module 228 or 314 uses the search result messages 412 to create search result models and compares the search result models to the original context model (block 414). The search result models may be compared to the original context model using any suitable scoring and/or comparison algorithm. For example, the client device 102 or the search system 114 may generate a score for each search result model by multiplying the weights of terms that are common to both the search result model and the original context model and then summing those products.

A search result model is a representation of a search result from an information source 108. Each search result model is a statistical and heuristic model of the search result that may include lexical (words or phrases) or symbolic (logical) data. For example, a summary from a news article including occurrences of the words dog and cat might be described by a search result model as "dog:4; cat:3; IsNewsArticle" where the numbers represent weights associated with the words, and IsNewsArticle indicates the type of document. In this example, the search result model indicates that the associated document is more about dogs than it is about cats. The weights may be assigned by any suitable algorithm. For example, the weighting algorithm may take into account the number of occurrences of each word, the location of each word (e.g., in the title of the summary versus in the body), the style of the words (e.g., bold text versus plain text), etc. In addition, the result modeling module 228 or 314 may use an information source-specific stop list when constructing the search result model in order to prevent the inclusion of certain terms. For example, "court" may be on the stop list for Lexis® but not on the stop list for Google™.

A search result model may include a summary of a search result returned by the information source 108 in response to a query, and/or the search result model may be derived from that summary through statistical and heuristic methods. The summaries returned by information sources 108, whether written by humans or automatically generated, are generally intended to enable human users to assess the relevance of the search results. Thus, these summaries are not necessarily optimal as, or for constructing, search result models for the purpose discussed here (i.e., for comparison with a context model to assess relevance of the search result to the user's current context). In certain embodiments, the information source 108 may return a fuller or more representative summary of the search result derived statistically and/or heuristically, specifically for the purpose of enabling ranking, organizing, and/or presenting information, as described here. More generally, the information source 108 may return meta-data about the search result and/or properties of the information source 108 itself. This meta-data may or may not be specifically designed for the purpose of enabling ranking, organizing, and/or presenting information.

In certain embodiments, an information source 108 may return the entire document associated with each search result, rich meta-data associated with each search result, or a model of each such document (as opposed to a summary of each document) that may include lexical and symbolic representations. For example, the search result model for a result returned by the information source may contain a list of words occurring in the document along with the frequency with which each word occurs in that document. The information source 108 may also return data concerning the information source 108 as a whole. For example, statistical information about the entire set of documents, such as the number of documents in which a term occurs, or other data elements the document contains. The search result model returned by the information source for a result may be based in part on this statistical information. For example, the weights associated with the terms in a list comprising an aspect of such a model may be modulated by this information. The search result model may also be based in part on a stop list to exclude certain terms from inclusion.

This search result model may also take into account the location of a term or terms in the document. For example, a term which is located in a heading in the document may be weighted more highly in the list of terms comprising an aspect of the search result model returned by the information source.

The model may also take into account stylistic aspects of the document. For example, a word which is in bold face, or in a larger font size than the rest of the document, may be weighted more highly in the list of terms. Conversely, a term which is in a smaller type font may have its weight reduced. The search result model may also take into account the order of terms in the document. For example, if two terms occur together in a given order, this order may be reflected in the search result model as well.

The search result model may also be based on the genre or type of the document. Examples of this include an archived email, a resume, a patent application, a legal brief, etc. The genre or type information may be used, for example, to determine a specialized stop list of terms to be excluded from the model. In addition, the genre or type information may be used to identify key terms of particular interest or to alter the weighting of terms in the model. For example, the terms following the label "Subject" in an archived email might be weighted more highly than other terms. Similarly, the result model may be based on the application used to create the document.

Furthermore, the search result model may contain aspects of the user context in which the document was originally produced, such as the task that resulted in that document. In one example, the present system may submit the context model to a search engine along with the user's document, when the document is being saved. The search engine could then return the stored context model along with the search results. Alternatively, the stored context model may be incorporated into the search result model returned for that document, or the search result model may be based on this stored context model. For example, other aspects of the search result model, such as the weights of terms, may be changed on the basis of this context model.

In this manner, improved assessment, ranking, organization and presentation may be performed based on a more detailed and accurate search result model. Alternatively, summary style search results typically include a pointer to the full document associated with the summary, which may be used to retrieve the full document. For example, most Internet search engines return a hyperlink to the associated web page. In any case, the client device 102 or the search system 114 may use a search result model created from some or all of the full document (as opposed to just the search result summary), in addition to other data about each search result. For example, the hyperlink itself may contain additional data that is helpful for ranking, organizing, or presenting search results for a given context model. In one example, search results are organized by the internet domain under which each search result occurs.

The assessment, organization, and ranking module 230 or 316 uses the comparison of the search result models to the original context model to assess, organize and rank the search results (block 416). In one example, the assessment, organization, and ranking module 230 or 316 compares all of the terms occurring in a search result model to terms occurring in the user's document. Consider a user working on a document about ecology and global warming. The context model might include terms like "ecology:5; 'global warming':10; emissions:9; co2:5; 'greenhouse gas':4." Further consider a search engine that only accepts one term. Given the context model above, the search term "global warming" might be selected as a query. The result of executing a search based on that term may result in several search results, with search result models as follows. Search Result 1:"'global warming':2; developing: 1; country:1; china:1." Search Result 2: "'global warming':2; 'greenhouse gas':2". According to the search engine, Search Result 1 is more relevant than Search Result 2. But the search engine does not have all of the information included in the context model. Therefore, the assessment, organization, and ranking module 230 or 316, may further compare the context model with these search results models to arrive at a score, for example, by multiplying the weights of terms occurring in the search result model with the weights of terms occurring in the context model and dividing by the number of unique terms in the search result model. If a term is not present in the context model, it may be given a weight of zero. In the example above, then, Search Result 1 would be given a score of 5, whereas Search Result 2 would be given a score of 14. The assessment, organization, and ranking module 230 or 316 may thereby determine Search Result 2 is more relevant to the user context than Search Result 1 and thereby rank Search Result 2 ahead of Search Result 1, even though the search engine originally ranked them in the opposite order. Similarly, when querying multiple search engines, the present method may be applied to search results from all search engines queried in order to rank search results into a single ordered list.

In addition to ranking and organizing, in some embodiments, the assessment, organization, and ranking module 230 or 316 may simply eliminate certain search results rather than presenting them to the user. Search engines sometimes return irrelevant results. This may be because the search engine lacks information about the user's context. The present example may eliminate search results with a weight of zero, allowing the system to only present search results that have at least one word in common with the user's context. Furthermore, search results that rank below a certain threshold, either absolute or relative to other results, may be eliminated.

For example, in one embodiment, the system is connected to one or more search engines such as one or more World-Wide Web (WWW) search engines. In a WWW search, there are typically no editorial controls on what information is contributed to the databases. As a result, these search engines may contain "junk" data. In some cases, data may be specifically generated by a malicious publisher to "game" the search engine so as to gain more referral traffic from the search engine, while providing no valuable information to the user. In the industry, this is called "search SPAM." In order to avoid presenting this irrelevant information to the user, the present system compares the query model with the search result model in order to determine the longest uninterrupted sequence of search terms occurring in the search result model returned by the search engine that occur in the same order as in the search query that originally generated that search result. In other words, the present system computes the longest matching subsequence of the search query that appears in the search result model. Search results that contain a sequence of search terms of length greater than or equal to a tunable parameter T in their descriptions, are considered search SPAM and preferably eliminated from the search results presented to the user. SPAM removal can be turned on and off on a per-information source basis so as to avoid false positives.

Furthermore, some of the search engines the system is connected to may provide search results that contain none of the words mentioned in the search query, so as to provide a list of search results to the user even when there are no exact matches. Typically, these documents are irrelevant. Therefore, the present system is preferably configured to eliminate search results for which there are no terms in common between the search result model and the context model.

The system may be connected to multiple WWW search engines, in addition to other databases that contain content that is less broadly applicable (e.g., Lexis-Nexis). Given the system is connected with so many different sources, many duplicate search results may be retrieved. Near-duplicates may be eliminated using methods described in USPTO Publication 2005/0028156. However, the resulting list may still contain similarities, and especially in light of the methods of ranking search results described herein, provide the user with too many documents that are related to the user's context in the same way. Therefore, if a search result is related to the user's context in the same or similar way as another search result, one of the two search results is preferably eliminated before the search results are presented to the user. This provides a more interesting list of search results. More specifically, given a context model C, consisting of terms C1, C2, . . . CN, a search result model R, consisting of terms R1, R2, . . . , RN, and another search result model R', consisting of terms R'1, R'2, . . . , R'N, then let I(C,R) be the intersection of C and R, and I(C,R') be the intersection of C and R'. If the size of the intersection of I(C,R) and I(C,R') is greater than a tunable parameter T, then R' is eliminated before the search results are presented to the user. In addition, term stems, multiple-word phrases, or any aspect of the context model or search result model may be substituted for terms; the function I may be substituted for any method of computing how a search result relates to a context; and the size of intersection may be replaced with a weighted comparison metric that may not be transitive (e.g., dot product, cosine, etc.) or any other suitable method for comparing relatedness.

The system might also use the results of comparing the search result models with the context model to organize the search results in some appropriate way, for example, by segmenting them based on categories that are selected based on the user's current task, or properties of the search results themselves. The ranked and organized search results are a combination of the search results from multiple information sources 108 in an order that is not necessarily the same as the order of the individual search results received from the information sources 108. For example, one information source 108 may return a summary of documents A, B, and C ranked in that order, and another information source 108 may return a summary of documents C, D, and F ranked in that order. However, the assessment, organization, and ranking module 230 or 316 may rank the combined results as B, C, D, A, F.

Figure 6:
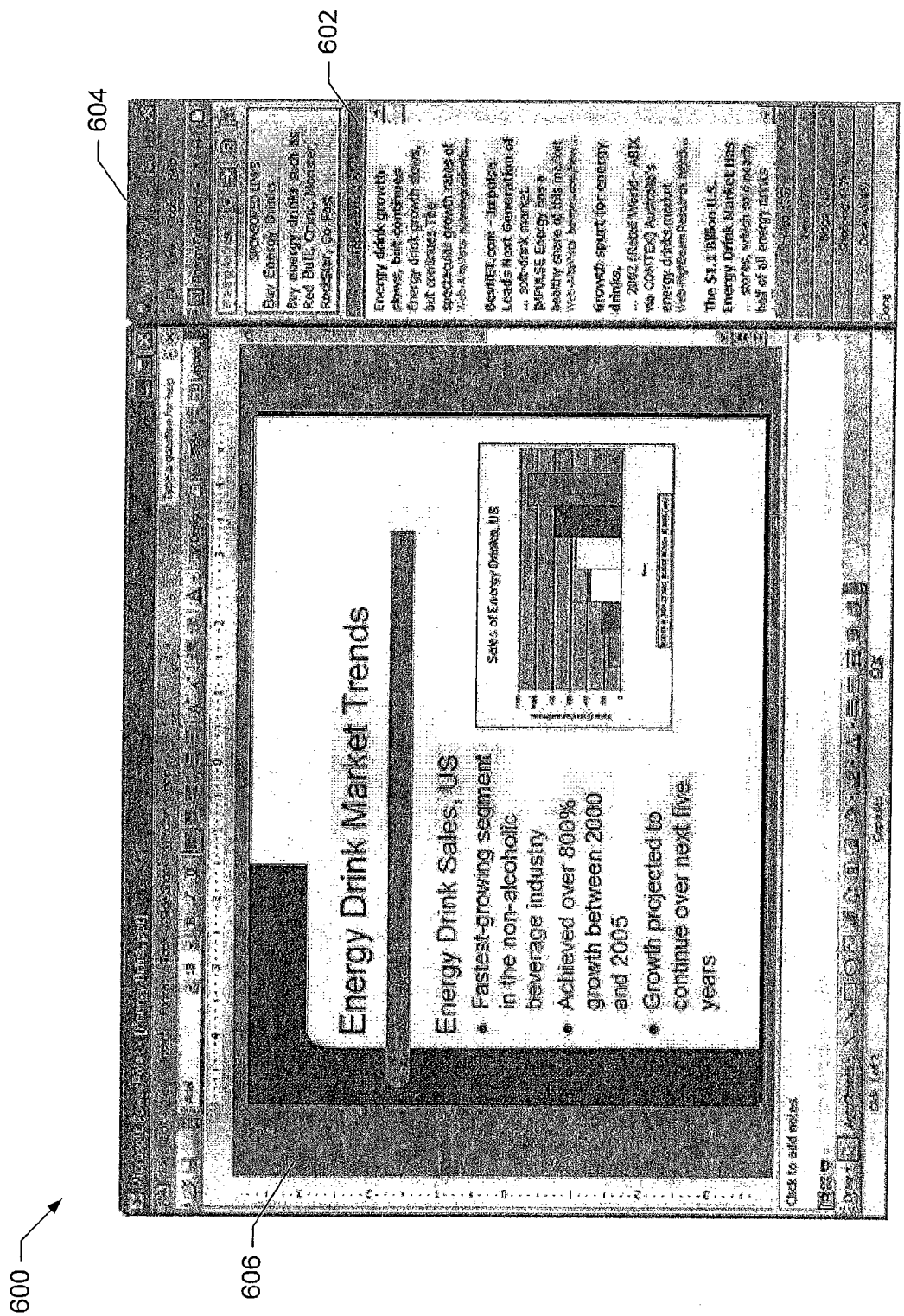
FIG. 6 is a screen shot showing an example user document and an example search results side bar with ranked search results.

The assessment, organization, and ranking module 230 or 316 uses the comparison of the search result models to the original context model to organize and present the search results (block 416). In other words, relevancy is a matter of degree (position in a list) and/or type (which group to be included in). An example of search results organized into different categories is illustrated in FIG. 6 (e.g., Top Results, Web, News, Blogs, Shopping, Desktop, etc.).

The original context model is used by the assessment, organization, and ranking module 230 or 316 to determine which organization scheme to use and which presentation strategy to pursue. When the user's context changes, the organization scheme and presentation strategy may also change to best support and reflect the user's current task, properties of the user's document, document genre, application, etc.

In one embodiment, search results are organized by the assessment, organization, and ranking module 230 or 316 based on combinations of rules activated by the original context model that combine a plurality of features of the search result model to produce a categorized list. Similar rules may be used to select a presentation strategy, e.g., a pop up display, banner, tickertape, embedded links in the user's active document, etc.

For example, when a user is composing an email message, information associated with the email recipient may be placed next to the email recipient, and information associated with the body of the email may be placed next to the body, whereas additional information on the topics discussed in each news article on a web site may be presented when the user moves her mouse over the text in the article. When the user is accessing an email application and composing an email in that application, the above presentation scheme may be selected by comparing aspects of the user context with a list of rules. For example, while writing an email, the user context could include representations of the application name, the application type, the active task, stage in the task, sender and recipient name, the location of the recipient in screen coordinates, and body of the email. More specifically, the context model might include: "ApplicationName='Microsoft Outlook'; ApplicationType='Email'; Task='ComposeEmail'; Stage='beginning'; Sender='John Doe'; Recipient='Jane Doe'; RecipientLocation='10,10' Body='Hi Jane,'". The system may further include rules of the form of antecedent consequent pairs, where antecedents include features of the context model and consequents include features of result models (so a subset of the results may be selected) and instructions on how to display the results. For example, consider a set of search results gathered from multiple search engines—WWW search engines, desktop search engines that contain email and files, and other databases, based on an email a user is composing. In order to display information about an email recipient next to the recipient's name, a rule may be expressed as follows to select search results that are email messages sent by the recipient and display those search results next to the location of the recipient on the screen: "IF Task='ComposeEmail' And ApplicationName='Microsoft Outlook' THEN SELECT DocumentType='Email' EmailSender=%Recipient% DISPLAY AT %RecipientLocation%". By binding variables previously accessible in the user context model with variables in the rule, the rule could then be rewritten as follows: "IF Task='ComposeEmail' And ApplicationName='Microsoft Outlook' THEN SELECT DocumentType='Email'='Jane Doe' DISPLAY AT '10,10'. A number of other organization schemes may be activated based on different user contexts by listing similar rules.

Search results may be categorized based on any attribute of the search result model, including the query that generated the search results. For example, the original context model may have specified the user as a lawyer, the user is viewing a contact in Microsoft Outlook and that the search results should be grouped by type, including, for example, news stories about the contact person's company, the home page of the contact person, email recently exchanged with that contact person, and any recent litigation filed by the contact person's company, among others. The query generation module 226 or 312 may then respond by dispatching several queries. For example, (1) a query to Lexis®, specifying that only news articles should be retrieved and specifying the contact person's company name, (2) another query to Yahoo! News® specifying the contact person's company name, (3) another to MSN® with the name and company name of the contact person, (4) another with the contact person's name to desktop search software, specifying recent email, and (5) yet another to Lexis®, specifying that only litigation in which the contact person's company name is named should be retrieved. The assessment, organization, and ranking module 230 or 316 could then group search results from queries (1) and (2) within a category labeled Company News, items from query (3) under Home Pages, search results from query (4) within a category labeled Recent Email, search results from query (5) under a category labeled Litigation, and so on.

Properties of each individual search result may be used in a similar way by the assessment, organization, and ranking module 230 or 316 to organize the search results. For example, the date the document corresponding to a given search result was published may be used to organize search results into categories such as today, last week, last month, last year, etc. by comparing the current date with the date associated with each search result. Similarly, the file format of the document, its subject area, words present or absent in the document summary or abstract, the content source, etc., may be used by the assessment, organization, and ranking module 230 or 316 to organize the search results.

To provide more organized and/or more complete information to the user, the assessment, organization, and ranking module 230 or 316 may determine that, given a user context, additional information is required in order to evaluate the quality and/or character of the search results. A single information source may not provide complete information about a retrieved item. For example, an internet search engine may provide a URL, Title, and Summary of a web site, but a social bookmarking site like del.icio.us may provide a user ranking for a given web site, along with comments about that web site, which could be useful in assessing, ranking and/or organizing search results provided by the internet search engine. The assessment, organization, and ranking module 230 or 316 may issue a number of additional queries in order to gather additional information based on an initial retrieval. For example, by retrieving user ratings, reviews and tags or categories for a web site retrieved in a first step, an original search result model may be enhanced. The assessment, organization, and ranking module 230 or 316 could then use this enhanced search result model to assess, rank, and/or organize search results by comparing the enhanced search result model with the original context model. For example, search results may be ordered by a combination of keyword overlap and user rating, and/or search results may be organized into categories labeled by tags (e.g., del.icio.us tags) users have given them. In addition, chains of arbitrary length associated with an arbitrary number of information sources may be constructed in order to further enhance the search result model for the purpose of assessing, ranking, and/or organizing search results with respect to a given context model.

In some contexts, information retrieved from one source can be combined with elements of the context model to provide input into another source. For example, while the user is shopping online, a product name may be extracted from the page in which the user is shopping. That product name may then be added to the context model. More specifically, say the user is viewing a page on a shopping site for a wireless mouse made by Microsoft. Given the user is visiting a shopping site, the system could infer that the user is shopping. Given the structure of the shopping site, the system could extract the product name and manufacturer from the web page, in addition to key words and phrases. Thus the context model may include "UserIsShopping; ProductName='Wireless Mouse'; ProductVendor='Microsoft'; Price='$29.99'" in addition to other important words and phrases like "PC, Windows, silver, optical".

Since the user is shopping, it may be desirable to retrieve information about similar products from other vendors. This product name may readily be used to look up vendors of similar products from a product database. The key words in the context model can be used to filter, sort, and/or organize the results of that search. Furthermore, in the context of shopping, and given this list of similar products from other vendors, it may be desirable to look up the price of those products or try and find images of those products to present to the user. Thus, the search system may direct a plurality of queries to a plurality of additional information sources in order to retrieve price information and an image of the product.

This information may then be further combined with the results of previous queries in order to form a more detailed search result model. Given the context model generated in previous steps, the search result model may then be further evaluated and organized so that the best information is presented to the user in a way that makes the most sense in the given context. For example, the system may organize the results of the above set of assessment and retrieval steps into a category of items presented in a user interface labeled "Similar Products" that includes a list of other wireless mice in the price range of $10-50, whose descriptions include at least two of the words and phrases originally present in the context model, and listed in order of most overlapping to least overlapping description. Other categories of information may be retrieved such as "Professional Reviews" or "User Comments" generated through a similar process of combining elements of the context model with elements of a first retrieval step, in order to formulate a second or third retrieval step, which is further evaluated, assessed and/or organized in light of the original context model.

It will be further appreciated that the original context model may itself be augmented as the result of a retrieval and assessment step. For example, if the only discernable property from a shopping site is a UPC code, the product name and manufacturer may be accessible from a product database. This information may then be incorporated into the context model and the above retrieval process may then be initiated. Thus, the search results model may be combined with the original context model to form a modified context model, which can then be subject to further retrieval, assessment, ranking and/or organization. This process of chaining sources allows the system to provide better search results to the user. The search results are organized, ranked, and/or assessed using more of the available information, even if that information must be retrieved from multiple information sources.

The assessment and ranking method outlined above may or may not be applied within a search result category, at the user's specification, based on properties of the user context, or properties of the search result model, etc. A similar method may be used to determine the presentation strategy for the search results. By combining sets of rules that operate on the properties of the search results model, the context model can flexibly specify how search results should be organized and presented by the assessment, organization, and ranking module 230 or 316.

The assessment, organization, and ranking module 230 or 316 then generates a ranked and organized search results message 418 specifying preferred presentation strategy. The ranked and organized search results may then be viewed by the user of the client device 102 at the same time the user views the document associated with the search results (block 420). For example, the ranked search results may be viewed in a side bar to the document being displayed by the client device 102 (see FIG. 6). In other embodiments, the assessment and ranking module may produce other instructions about how the results should be displayed, for example, by organizing the search results into categories, or by specifying the most appropriate user interface modality, for example, by embedding links into the user's active document, given the current context model.

Figure 5:
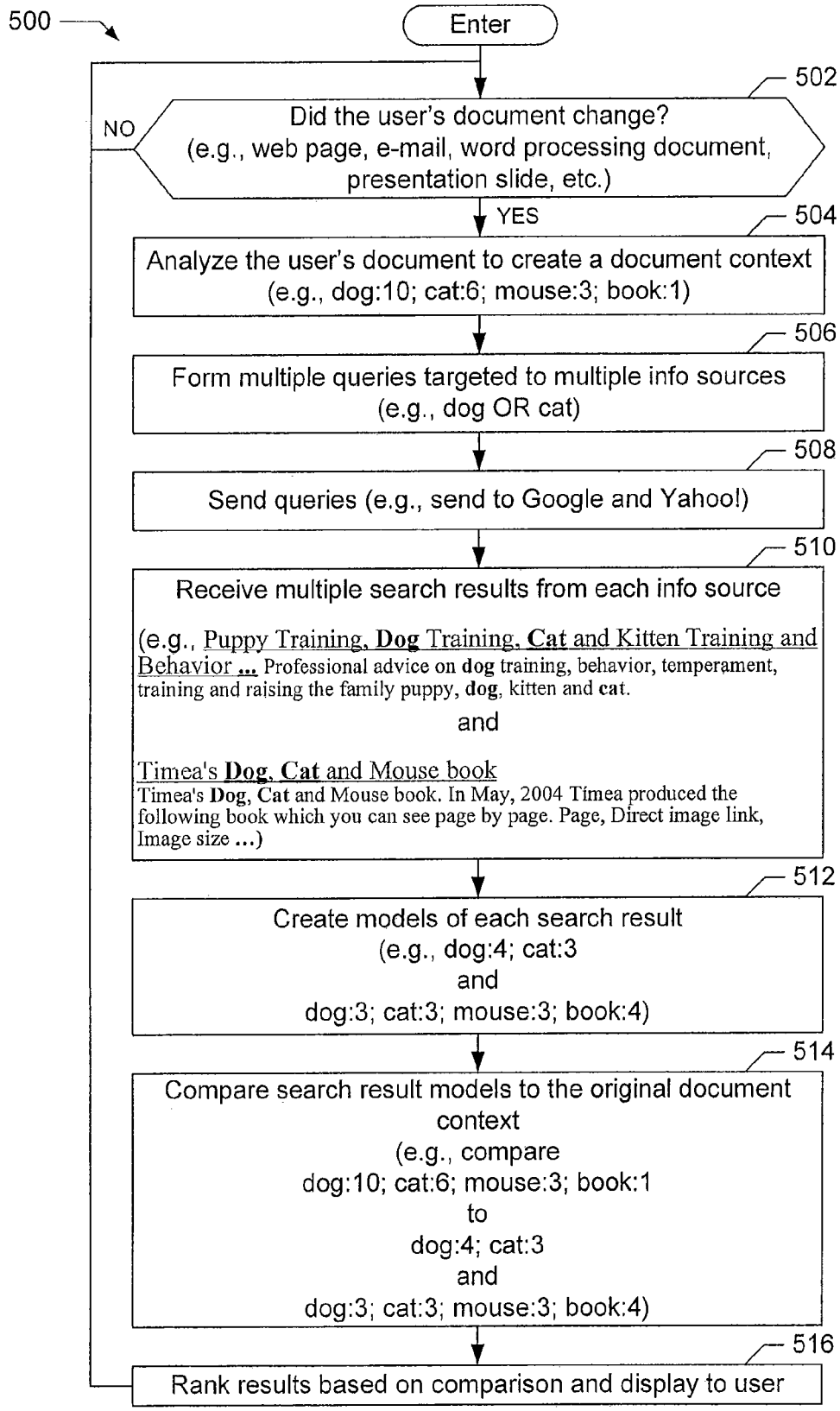
FIG. 5 is a flowchart of an example process for obtaining and ranking search results.

A flowchart of an example process 500 for obtaining and assessing and ranking search results is illustrated in FIG. 5. Preferably, the process 500 is embodied in one or more software programs which is stored in one or more memories and executed by one or more processors. For example, the process 500 may be software running on a client device 102 and/or the context based search system 114. Although the process 500 is described with reference to the flowchart illustrated in FIG. 5, it will be appreciated that many other methods of performing the acts associated with the process 500 may be used. For example, the order of many of the steps may be changed, and some of the steps described may be optional.

Generally, the process 500 analyzes a user's current context, including in particular a document being viewed by the user at a client device 102 to automatically form multiple search queries associated with that document. The queries are sent to multiple information sources 108, which respond with different search results. Models of the search results are then compared to a context model as described above to create a ranked and organized list of the search results for display to the user.

More specifically, the process 500 is typically triggered each time a document being viewed at a client device 102 changes (block 502). For example, the user may click a hyperlink in a web page, thereby changing the content of a browser window, or the user may simply change focus (e.g., where the cursor is placed) within the same document.

When the document changes, the client device 102 or the search system 114 analyze the document as well as other aspects of the user's context as described above to create a context model (block 504). As described above, the context model is a statistical and heuristic model of the user's context. For example, if the user is viewing a text document that includes occurrences of the words dog, cat, mouse, and book, the context model might be "dog:10; cat:6; mouse:3; book:1" where the numbers represent weights associated with the words. Again, the weighting algorithm may take into account the number of occurrences of each word, the location of each word (e.g., in the title of the document versus in the body), the style of the words (e.g., bold text versus plain text), properties of the user's task, the active application, the user's role in an organization, etc., as described earlier. It will be appreciated that any suitable method of generating context models may be used.

Based on the context model, the client device 102 or the search system 114 forms multiple queries targeted to multiple information sources 108 (block 506). As described above, different information sources may have different limitations placed on how queries may be formed. Accordingly, the search system 114 customizes each query for each information source 108. For example, an information source 108 that only allows two search terms may receive the query "dog OR cat". The client device 102 or the search system 114 then sends the queries to the respective information sources (block 508). For example, the client device 102 or the search system 114 may send one query to Google™ over the Internet and another query to a proprietary database over a local intranet.

In response, each information source 108 searches one or more databases and generates a set of search results, which are received by the client device 102 or the search system 114 (block 510). For example, one or more information sources 108 may return the search result summaries shown in block 510 of FIG. 5. In these example search results, the example search terms (i.e., dog and cat) appear in the search result titles and the search result bodies. In addition, other words contained in the example context model (i.e., mouse and book) appear in one of the example search results even though those words were not included in this example search query.

The client device 102 or the search system 114 then creates a model of each search result (block 512). For example, "dog:4; cat:3" may model the first example search result in block 512, and "dog:3; cat:3; mouse:3; book:4" may model the second example search result in block 512. In these examples, the modeling algorithm counted occurrences of a term in the title of a search result as having a weight of two and occurrences of a term in the body of a search result as having a weight of one. For example, the first example search result in block 512 includes one occurrence of "dog" in the title (counted as a weight of two) and two occurrences of "dog" in the body (counted as a weight of one each) for a total weight of four. It will be appreciated that any suitable method of modeling search results may be used.

The client device 102 or the search system 114 then compares the search result models to the original context model (block 514) using any suitable scoring algorithm and ranks the search results based on these scores. In addition, the client device 102 or the search system 114 may eliminate certain search results, organize certain search results into categories or folders, or, in general, determine how the search results should be best presented to the user in light of the original context model. The ranked and organized search results are then displayed to the user (block 516).

An example screen shot 600 of ranked search results 602 being displayed in a side bar 604 to a document 606 by a client device 102 is illustrated in FIG. 6. In this example, the document 606 is a presentation slide about increasing sales of energy drinks. Accordingly, the client device 102 or the search system 114 assigned a high score to search results associated with energy drink growth (i.e., ranked toward the top of the combined search results).

Figure 7:
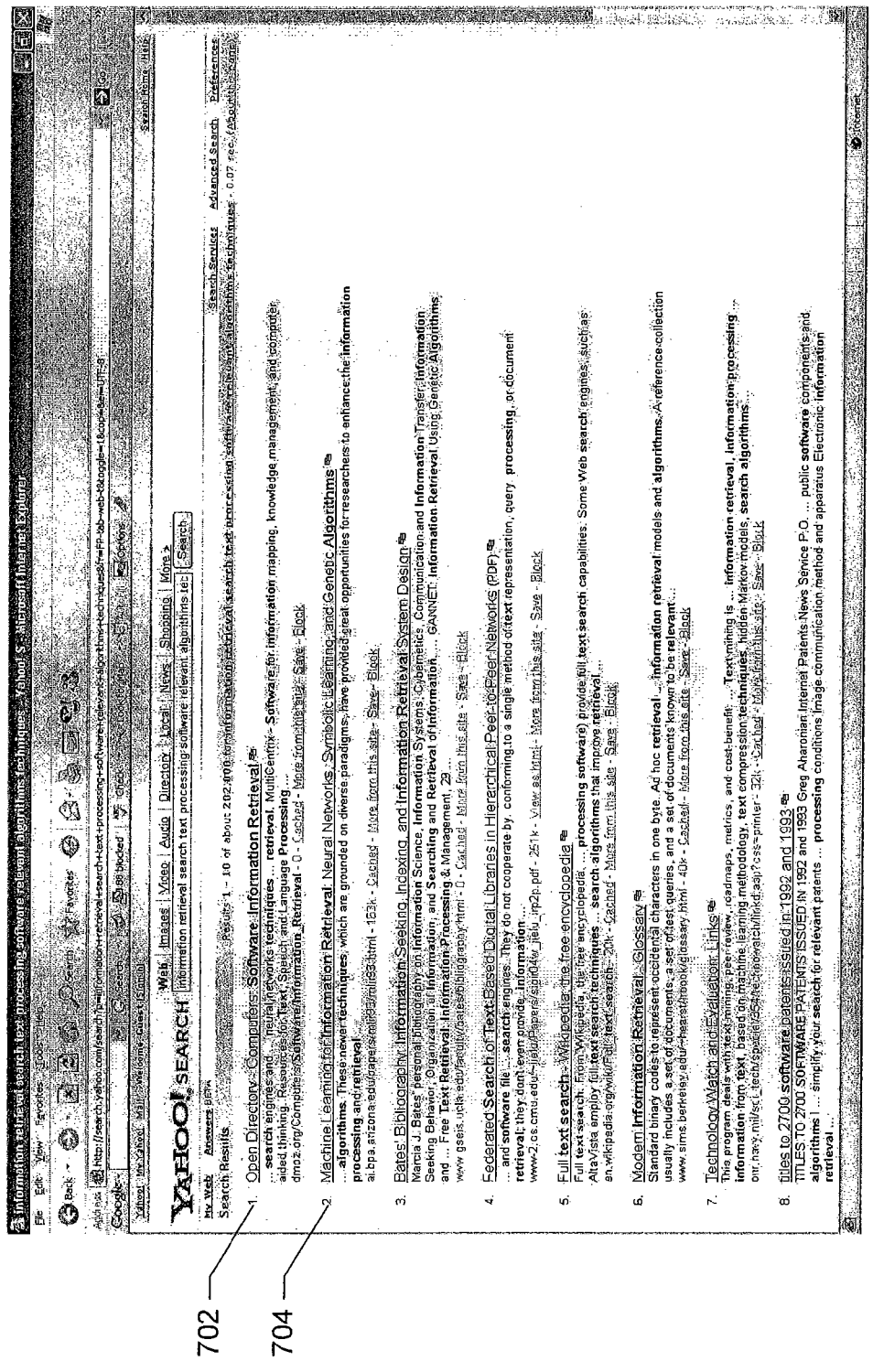
FIG. 7 is a screen shot showing an example search results web page from one information source.
Figure 8:
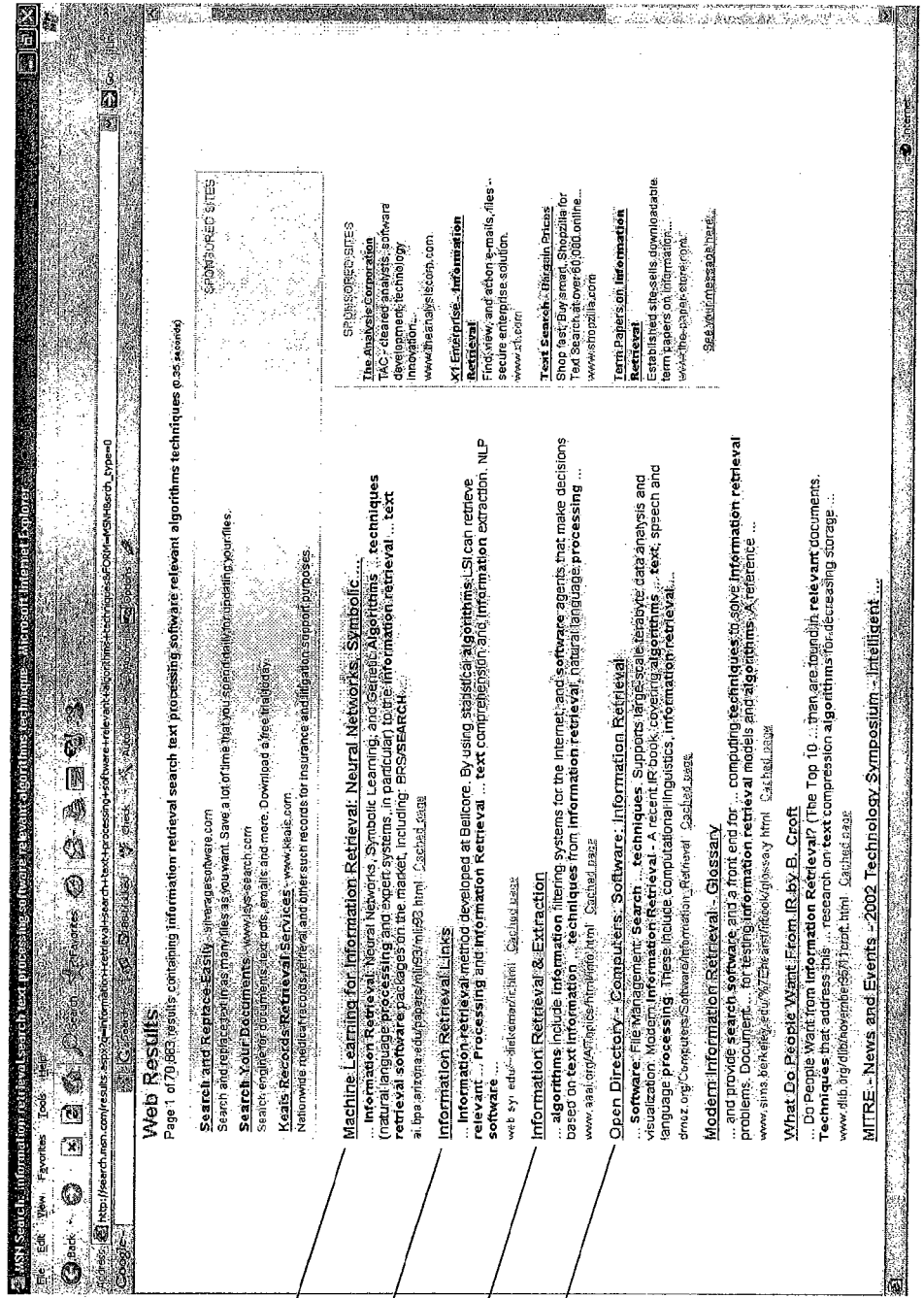
FIG. 8 is a screen shot showing an example search results web page from another information source.
Figure 9:
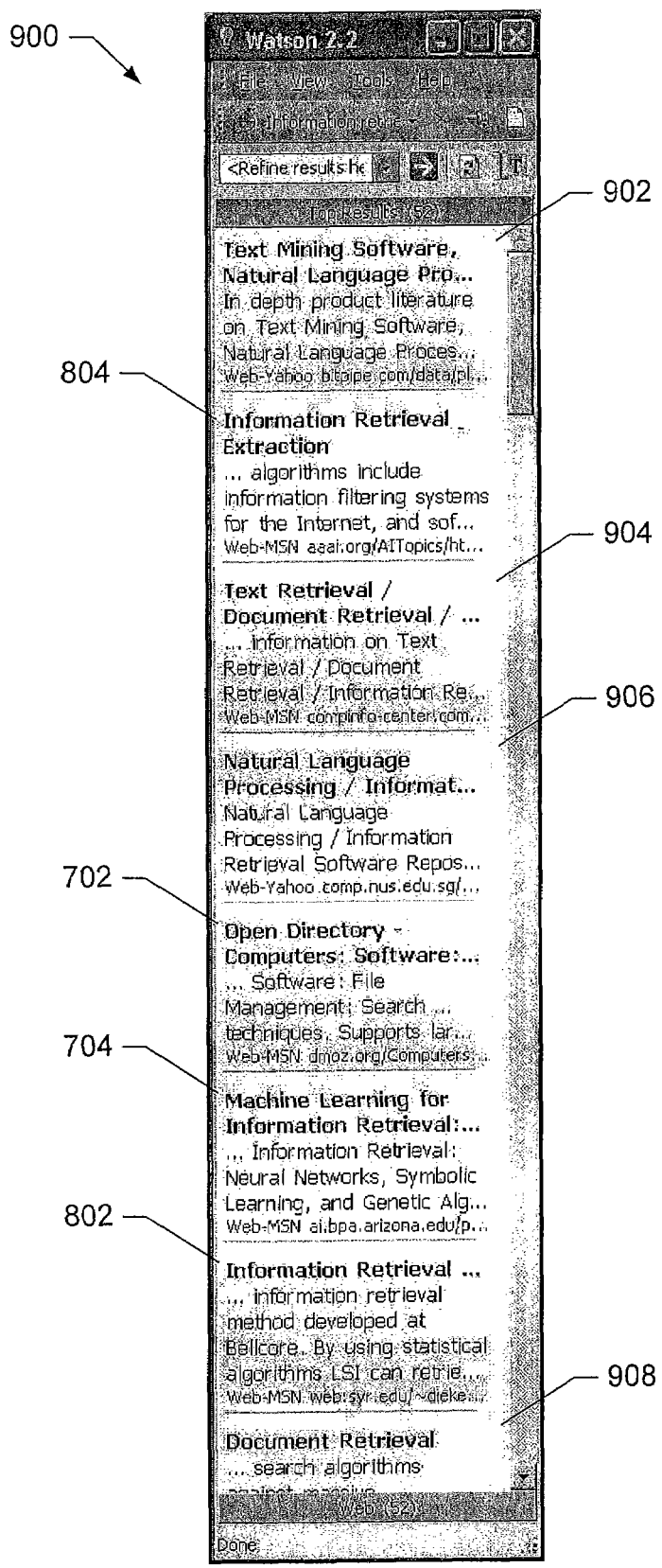
FIG. 9 is a screen shot showing an example search results side bar in accordance with an embodiment of the present system.

An example screen shot 700 of a search results web page from one information source is illustrated in FIG. 7. An example screen shot 800 of a search results web page from another information source is illustrated in FIG. 8. An example screen shot of a search results side bar in accordance with an embodiment of the present system is illustrated in FIG. 9. In these examples, certain search results 702 and 704 are located both of the prior art search results 700 and/or 800 and are also included in the combined search results 900. Other search results 802 and 804 are only located in one of the prior art search results 800 and are also included in the combined search results 900. Still other search results 902-908 in the combined search results 900 may not be in either of the prior art search results 700 and 800. As shown, the combined search results 900 may be in any order (i.e., not necessarily the same order as one or more of the prior art systems 700 and/or 800).

In summary, persons of ordinary skill in the art will readily appreciate that methods and apparatus for assessing, ranking, organizing and presenting search results have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention not be limited by this detailed description of examples.

What is claimed is:

1. A computer-implemented method of characterizing one or more search results as non-spam, the method comprising:
   determining a user context based on a tunable parameter;
   determining a first aspect of the user context and a second aspect of the user context, wherein the first aspect of the user context includes data indicative of text being accessed by a user, and the second aspect of the user context includes data indicative of at least one user task from a plurality of user tasks, wherein the at least one user task is determined based upon the user context of the user's interaction with one or more software applications, formulating a search query based on the user context, the search query being different than the user context;

submitting the search query to a search engine;

receiving one or more search results from the search engine;

comparing data indicative of the one or more search results to data indicative of the user context to determine a spam score, the spam score based on at least one of: a character length of a longest matching substring and a word length of the longest matching substring, wherein the longest matching substring appears in the search result and the search query;

characterizing the one or more search results as non-spam based upon comparing the spam score to a threshold; and displaying the one or more search results characterized as non-spam on a client device.

2. The method of claim 1, wherein the threshold is a tunable threshold.

3. The method of claim 1, wherein the spam score identifies a potential spam level.

4. The method of claim 1, wherein the search query is based on a first aspect of a user context, the first aspect of the user context including data indicative of text being accessed by a user, the query being different than the user context.

5. The method of claim 4, wherein the first aspect of the user context includes data indicative of the at least one task.

6. The method of claim 4, including comparing data indicative of a plurality of search results to data indicative of a second aspect of the user context to determine a plurality of relevance scores associated with the plurality of search results, the second aspect of the user context including data indicative of at least one task in which the user is engaged out of a plurality of possible user tasks.

7. The method of claim 6, wherein the second aspect of the user context includes the data indicative of the text being accessed by the user.

8. The method of claim 6, wherein the first aspect of the user context includes the second aspect of the user context.

9. The method of claim 6, wherein the first aspect of the user context is based on at least one of (a) a number of words in the text being accessed by the user, and (b) a number of sentences in the text being accessed by the user.

10. The method of claim 6, wherein the second aspect of the user context is based on at least one of (a) a location of the at least one predetermined word in the text being accessed by the user, (b) a style of the at least one predetermined word in the text being accessed by the user, (c) a presence of at least one specified word in the text being accessed by the user, (d) an absence of the at least one specified word in the text being accessed by the user, (e) metadata attributes of at least a portion of the text being accessed by the user, (f) a field presented by a computer application, (g) an attribute of information being presented in the computer application, (h) an element of the computer application visible to the user, (i) a document genre, (j) a document type, (k) a type associated with the computer application, (l) a method by which the user is accessing the computer application, (m) a role in an organization, (n) a type of the organization, (o) a property of the organization, (p) a stage in a task, (q) a stage in a workflow, (r) a type of task being supported by the computer application, (s) a stage in a task being executed by the computer application, (t) a pervious user behavior, (u) a topical area of interest, (v) a proportion of hyperlinked text to non-hyperlinked text, and (w) an average sentence length in the text being accessed by the user.

11. The method of claim 6, wherein the second aspect of the user context is based on at least five of (a) a location of the at least one predetermined word in the text being accessed by the user, (b) a style of the at least one predetermined word in the text being accessed by the user, (c) a presence of at least one specified word in the text being accessed by the user, (d) an absence of the at least one specified word in the text being accessed by the user, (e) metadata attributes of at least a portion of the text being accessed by the user, (f) a field presented by a computer application, (g) an attribute of information being presented in the computer application, (h) an element of the computer application visible to the user, (i) a document genre, (j) a document type, (k) a type associated with the computer application, (l) a method by which the user is accessing the computer application, (m) a role in an organization, (n) a type of the organization, (o) a property of the organization, (p) a stage in a task, (q) a stage in a workflow, (r) a type of task being supported by the computer application, (s) a stage in a task being executed by the computer application, (t) a pervious user behavior, (u) a topical area of interest, (v) a proportion of hyperlinked text to non-hyperlinked text, and (w) an average sentence length in the text being accessed by the user.

12. The method of claim 6, wherein the second aspect of the user context is based on (a) a style of the at least one predetermined word in the text being accessed by the user and (b) a type associated with a computer application.

13. The method of claim 6, including comparing data indicative of a plurality of search results to data indicative of at least one of the first aspect of the user context and the second aspect of the user context to determine a plurality of organization schemes, the plurality of organization schemes grouping at least a portion of the plurality of search results into at least two genres.

14. The method of claim 13, including generating a display indicative of a ranked list of search results that is indicative of the plurality of organization schemes.

15. The method of claim 1, including determining a second search query from a user context and interim search result.

16. An apparatus for characterizing one or more search results as non-spam, the apparatus comprising:

a processor;

a memory device operatively coupled to the processor; and a network device operatively coupled to the processor, wherein the memory device stores a software program to cause the processor to:

determine a user context based on a tunable parameter;

determine a first aspect of the user context and a second aspect of the user context, wherein the first aspect of the user context includes data indicative of text being accessed by a user, and the second aspect of the user context includes data indicative of at least one user task from a plurality of user tasks, wherein the at least one user task is determined based upon the user context of the user's interaction with one or more software applications, formulate a search query based on the user context, the search query being different than the user context;

submit the search query to a search engine;

receive one or more search results from the search engine;

compare data indicative of the one or more search results to data indicative of the user context to determine a spam score, the spam score based on at least one of: a character length of a longest matching substring and a word length of the longest matching substring, wherein the longest matching substring appears in the search result and the search query;

characterize the one or more search results as non-spam based upon comparing the spam score to a threshold; and display the one or more search results characterized as non-spam on a client device.

17. The apparatus of claim 16, wherein the threshold is a tunable threshold.

18. The apparatus of claim 16, wherein the spam score identifies a potential spam level.

19. The apparatus of claim 16, wherein the search query is based on a first aspect of a user context, the first aspect of the user context including data indicative of text being accessed by a user, the query being different than the user context.

20. The apparatus of claim 19, wherein the first aspect of the user context includes data indicative of the at least one task.

21. The apparatus of claim 19, wherein the software program is structured to cause the processor to compare data indicative of a plurality of search results to data indicative of a second aspect of the user context to determine a plurality of relevance scores associated with the plurality of search results, the second aspect of the user context including data indicative of at least one task in which the user is engaged out of a plurality of possible user tasks.

22. The apparatus of claim 21, wherein the second aspect of the user context is based on at least five of (a) a location of the at least one predetermined word in the text being accessed by the user, (b) a style of the at least one predetermined word in the text being accessed by the user, (c) a presence of at least one specified word in the text being accessed by the user, (d) an absence of the at least one specified word in the text being accessed by the user, (e) metadata attributes of at least a portion of the text being accessed by the user, (f) a field presented by a computer application, (g) an attribute of information being presented in the computer application, (h) an element of the computer application visible to the user, (i) a document genre, (j) a document type, (k) a type associated with the computer application, (l) a method by which the user is accessing the computer application, (m) a role in an organization, (n) a type of the organization, (o) a property of the organization, (p) a stage in a task, (q) a stage in a workflow, (r) a type of task being supported by the computer application, (s) a stage in a task being executed by the computer application, (t) a pervious user behavior, (u) a topical area of interest, (v) a proportion of hyperlinked text to non-hyperlinked text, and (w) an average sentence length in the text being accessed by the user.

23. The apparatus of claim 21, wherein the second aspect of the user context is based on (a) a style of the at least one predetermined word in the text being accessed by the user and (b) a type associated with a computer application.

24. A computer readable storage device storing a software program to cause a computing device to:

determine a user context based on a tunable parameter;

determine a first aspect of the user context and a second aspect of the user context, wherein the first aspect of the user context includes data indicative of text being accessed by a user, and the second aspect of the user context includes data indicative of at least one user task from a plurality of user tasks, wherein the at least one user task is determined based upon the user context of the user's interaction with one or more software applications, formulate a search query based on the user context, the search query being different than the user context;

submit the search query to a search engine;

receive one or more search results from the search engine;

compare data indicative of the one or more search results to data indicative of the user context to determine a spam score, the spam score based on at least one of: a character length of a longest matching substring and a word length of the longest matching substring, wherein the longest matching substring appears in the search result and the search query;

characterize the one or more search results as non-spam based upon comparing the spam score to a threshold; and display the one or more search results characterized as non-spam on a client device.

25. The computer readable storage device of claim 24, wherein the threshold is a tunable threshold.

26. The computer readable storage device of claim 24, wherein the spam score identifies a potential spam level.

27. The computer readable storage device of claim 24, wherein the search query is based on a first aspect of a user context, the first aspect of the user context including data indicative of text being accessed by a user, the query being different than the user context.

28. The computer readable storage device of claim 27, wherein the first aspect of the user context includes data indicative of the at least one task.

29. The computer readable storage device of claim 24, wherein the software program is structured to cause the computing device to compare data indicative of a plurality of search results to data indicative of a second aspect of the user context to determine a plurality of relevance scores associated with the plurality of search results, the second aspect of the user context including data indicative of at least one task in which the user is engaged out of a plurality of possible user tasks.

30. The computer readable storage device of claim 29, wherein the second aspect of the user context is based on at least five of (a) a location of the at least one predetermined word in the text being accessed by the user, (b) a style of the at least one predetermined word in the text being accessed by the user, (c) a presence of at least one specified word in the text being accessed by the user, (d) an absence of the at least one specified word in the text being accessed by the user, (e) metadata attributes of at least a portion of the text being accessed by the user, (f) a field presented by a computer application, (g) an attribute of information being presented in the computer application, (h) an element of the computer application visible to the user, (i) a document genre, (j) a document type, (k) a type associated with the computer application, (l) a method by which the user is accessing the computer application, (m) a role in an organization, (n) a type of the organization, (o) a property of the organization, (p) a stage in a task, (q) a stage in a workflow, (r) a type of task being supported by the computer application, (s) a stage in a task being executed by the computer application, (t) a pervious user behavior, (u) a topical area of interest, (v) a proportion of hyperlinked text to non-hyperlinked text, and (w) an average sentence length in the text being accessed by the user.

31. The computer readable storage device of claim 29, wherein the second aspect of the user context is based on (a) a style of the at least one predetermined word in the text being accessed by the user and (b) a type associated with a computer application.

* * * * *